Sept. 28, 1948. B. J. CRAIG 2,450,372
COINCIDENTAL VEHICLE DOOR LOCKING SYSTEM
Filed May 3, 1944 16 Sheets-Sheet 1
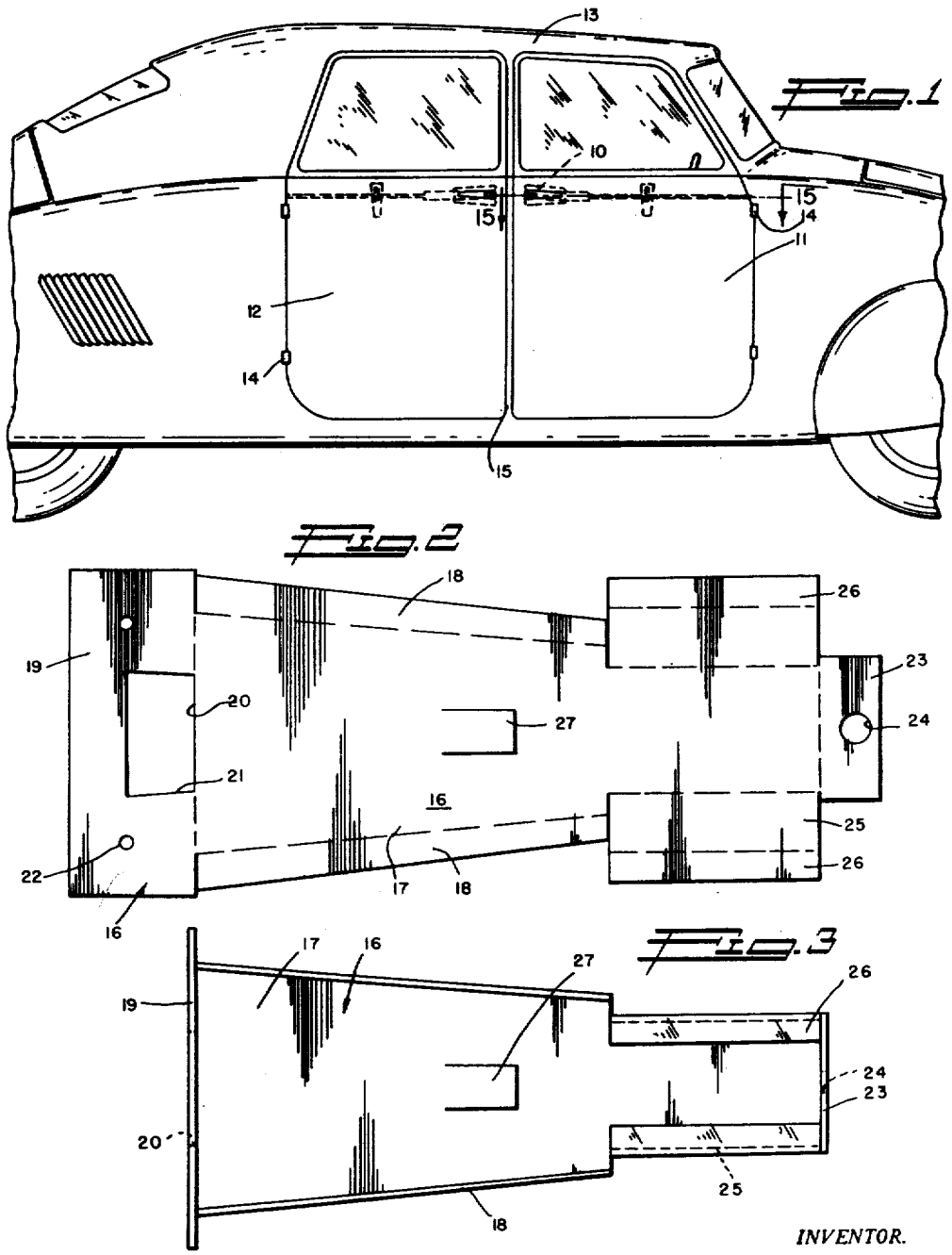
INVENTOR.
B. J. Craig.

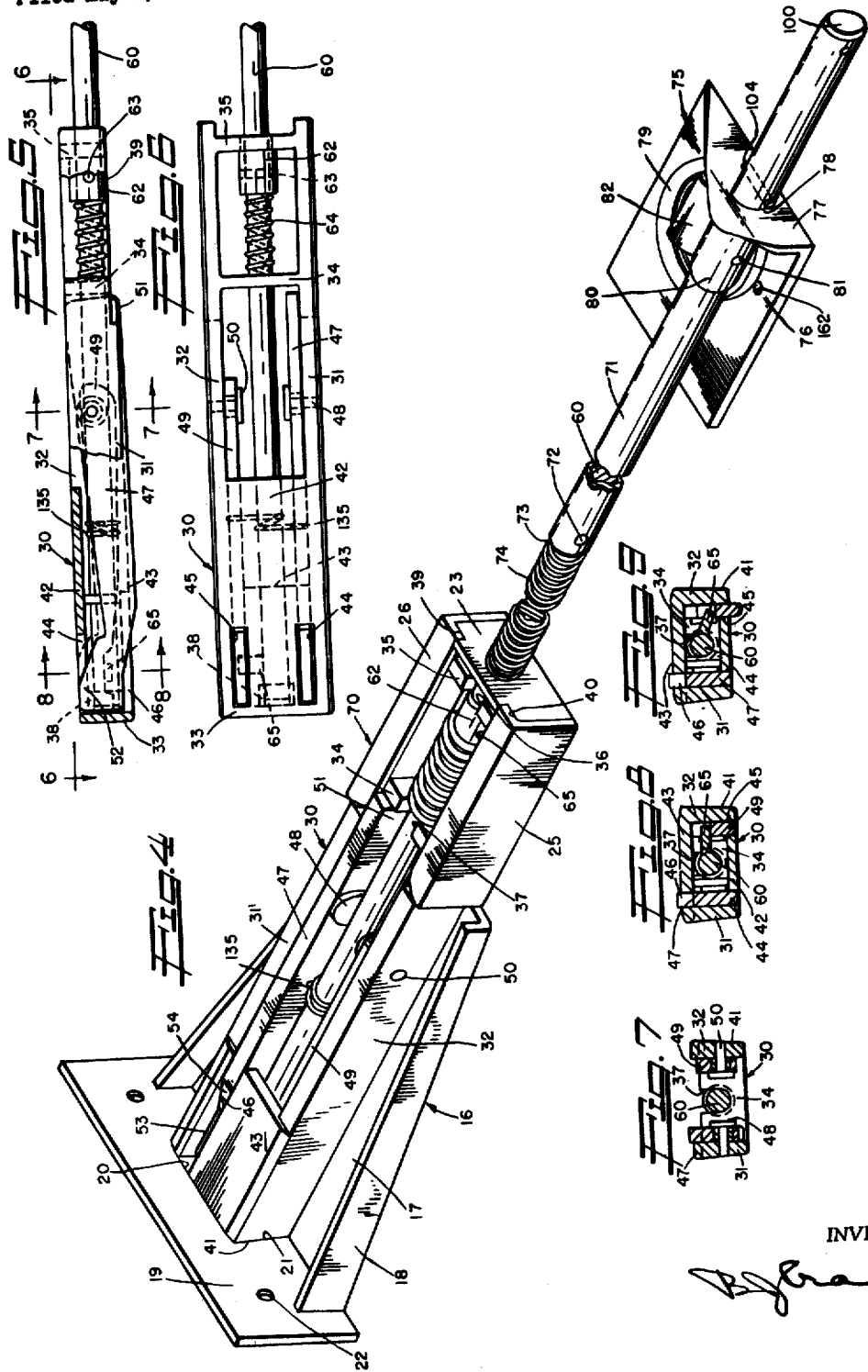

Sept. 28, 1948.  B. J. CRAIG  2,450,372
COINCIDENTAL VEHICLE DOOR LOCKING SYSTEM
Filed May 3, 1944  16 Sheets-Sheet 3
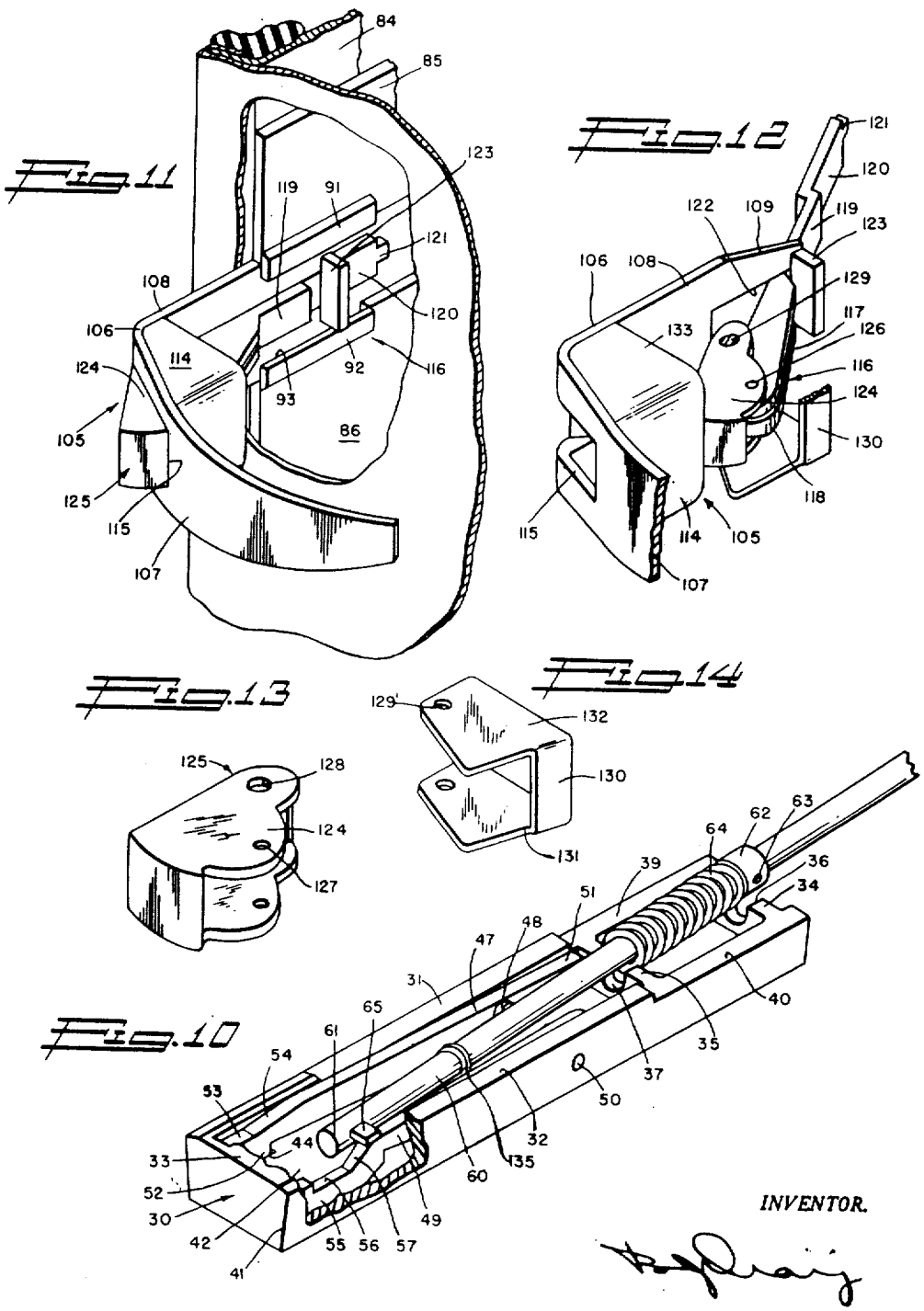
INVENTOR.

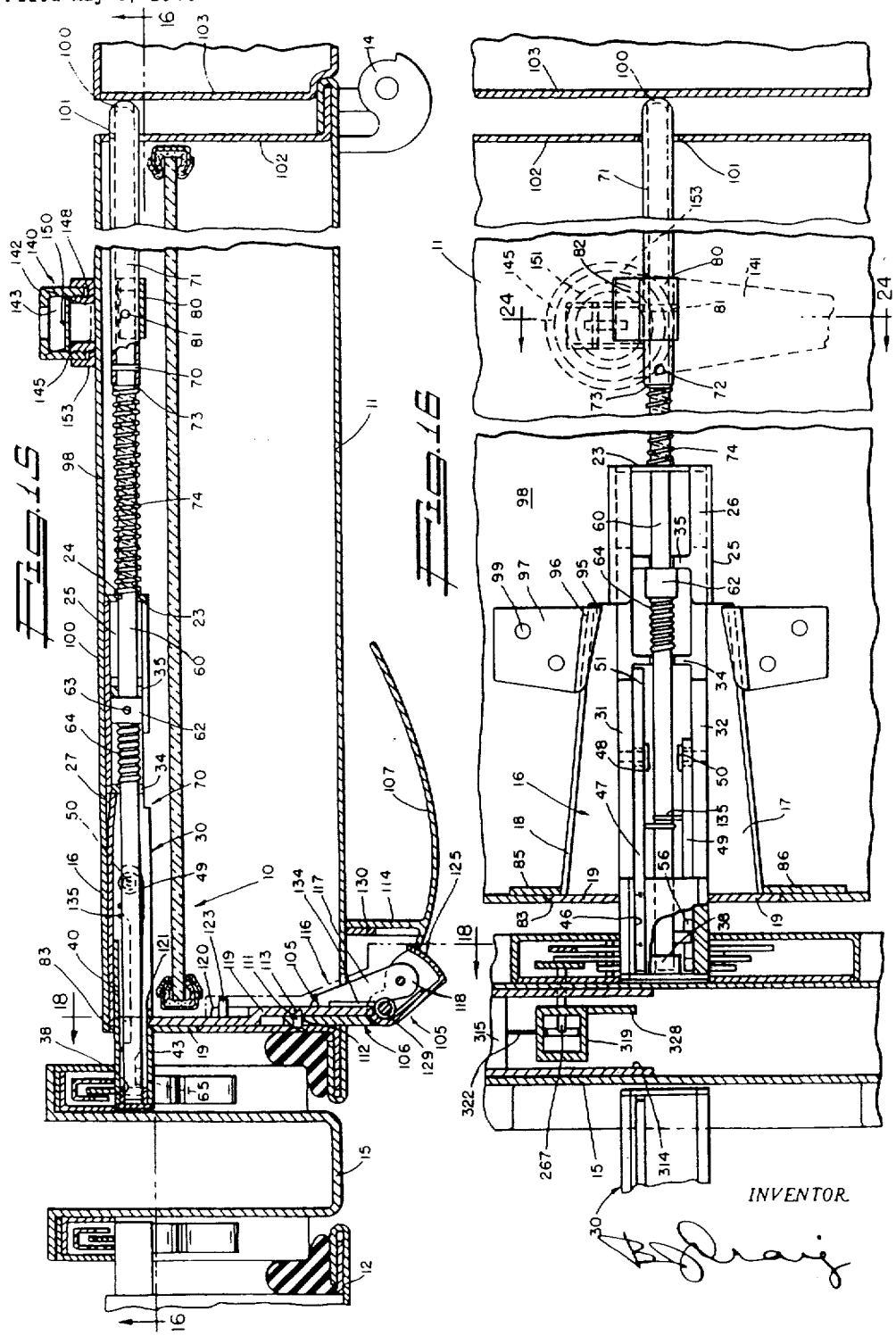

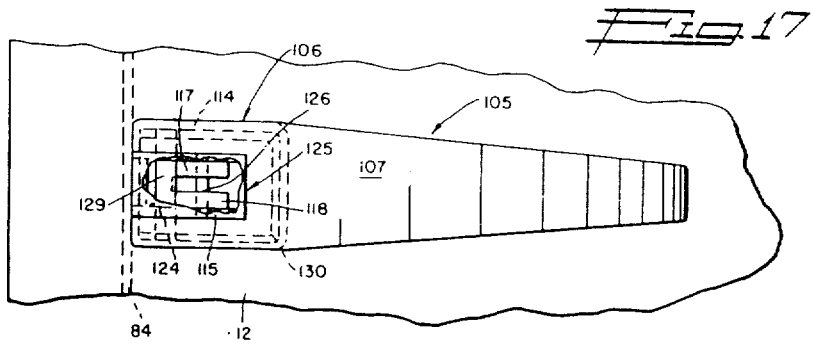
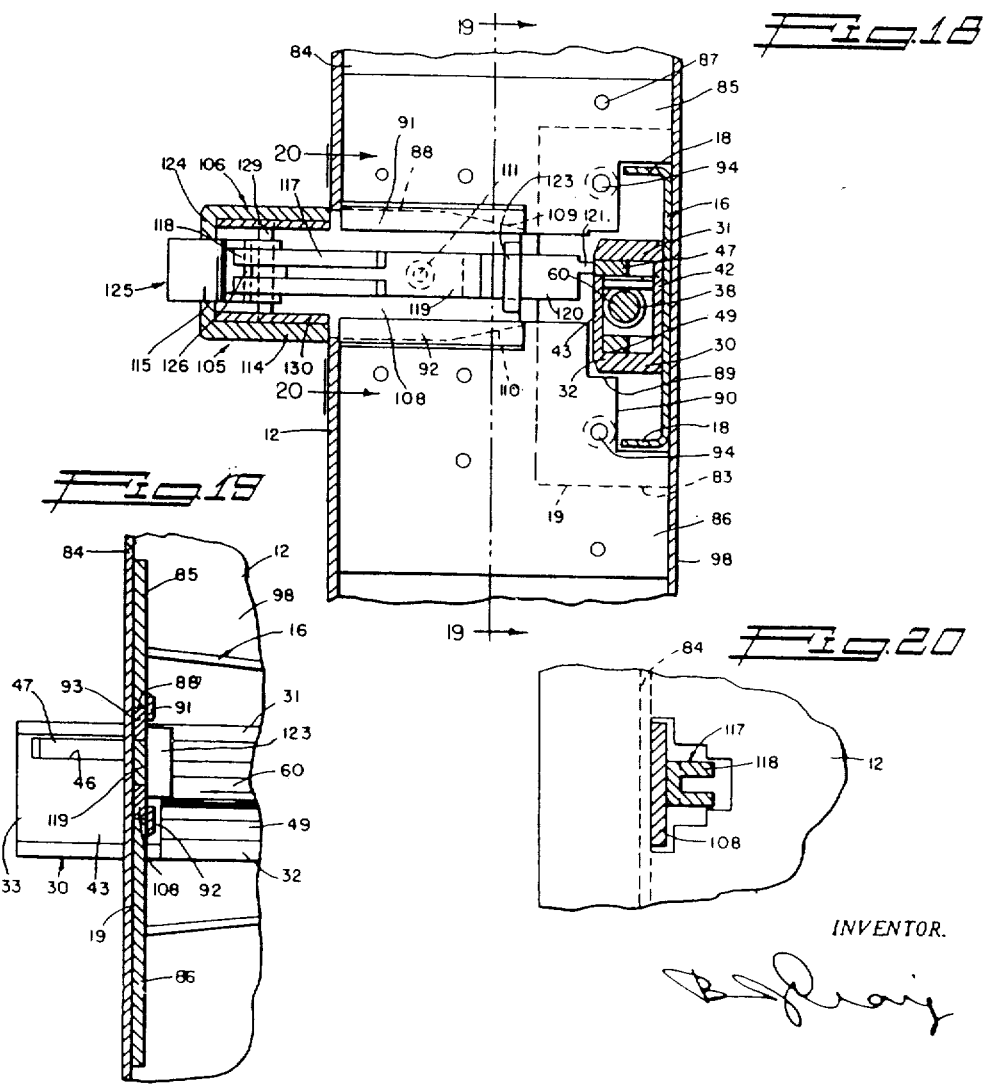

Sept. 28, 1948.  B. J. CRAIG  2,450,372
COINCIDENTAL VEHICLE DOOR LOCKING SYSTEM
Filed May 3, 1944  16 Sheets-Sheet 6
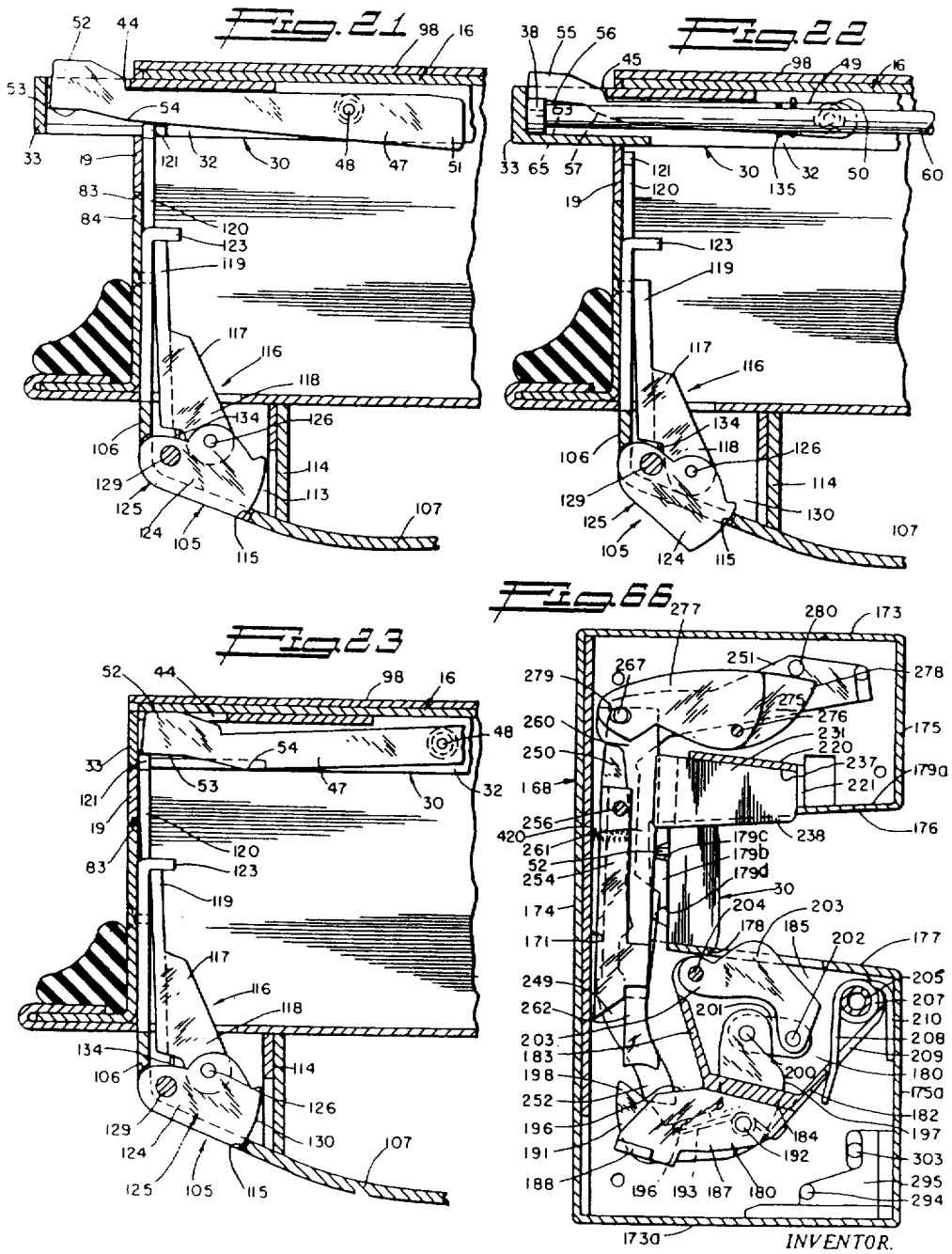
INVENTOR.
B. J. Craig

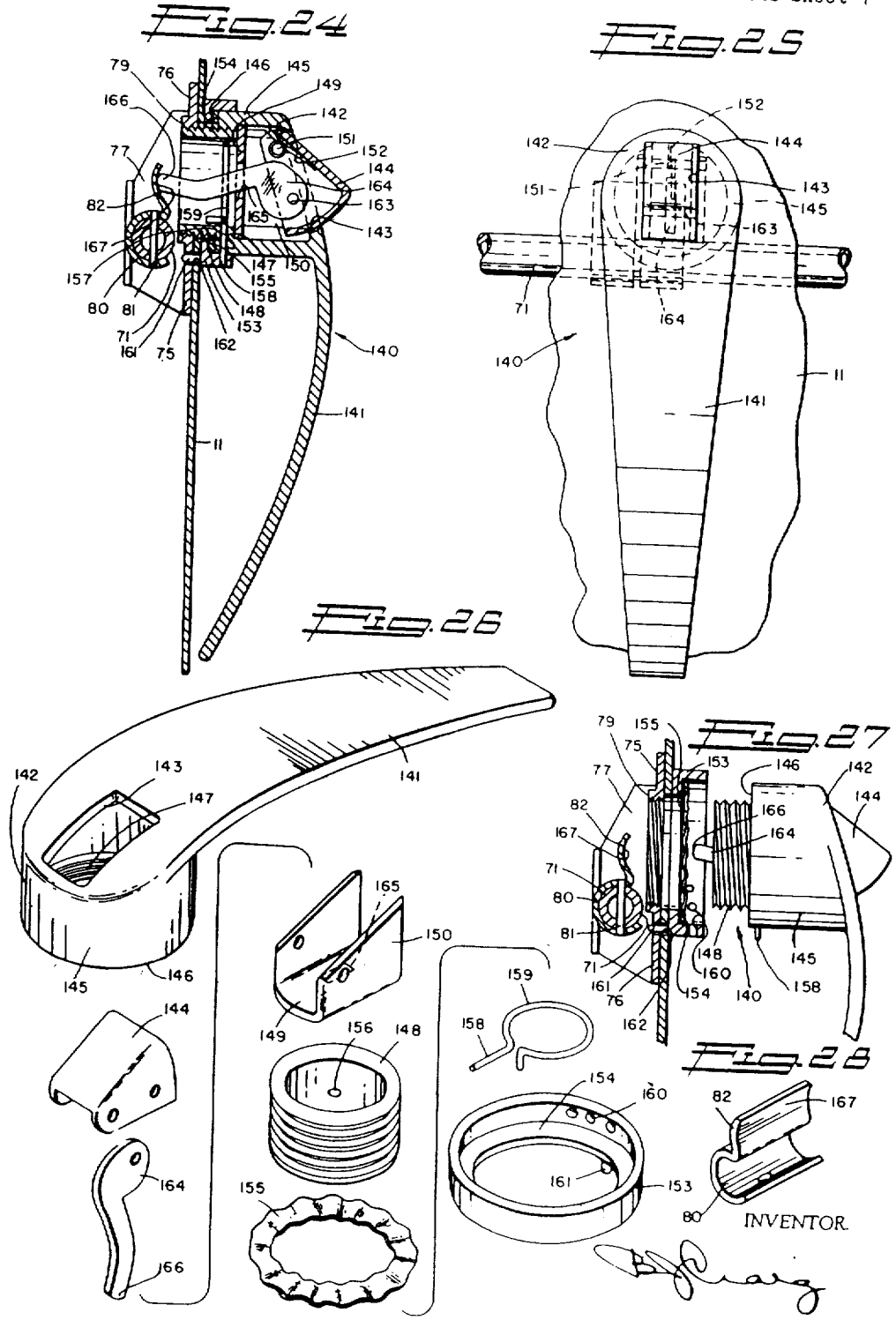

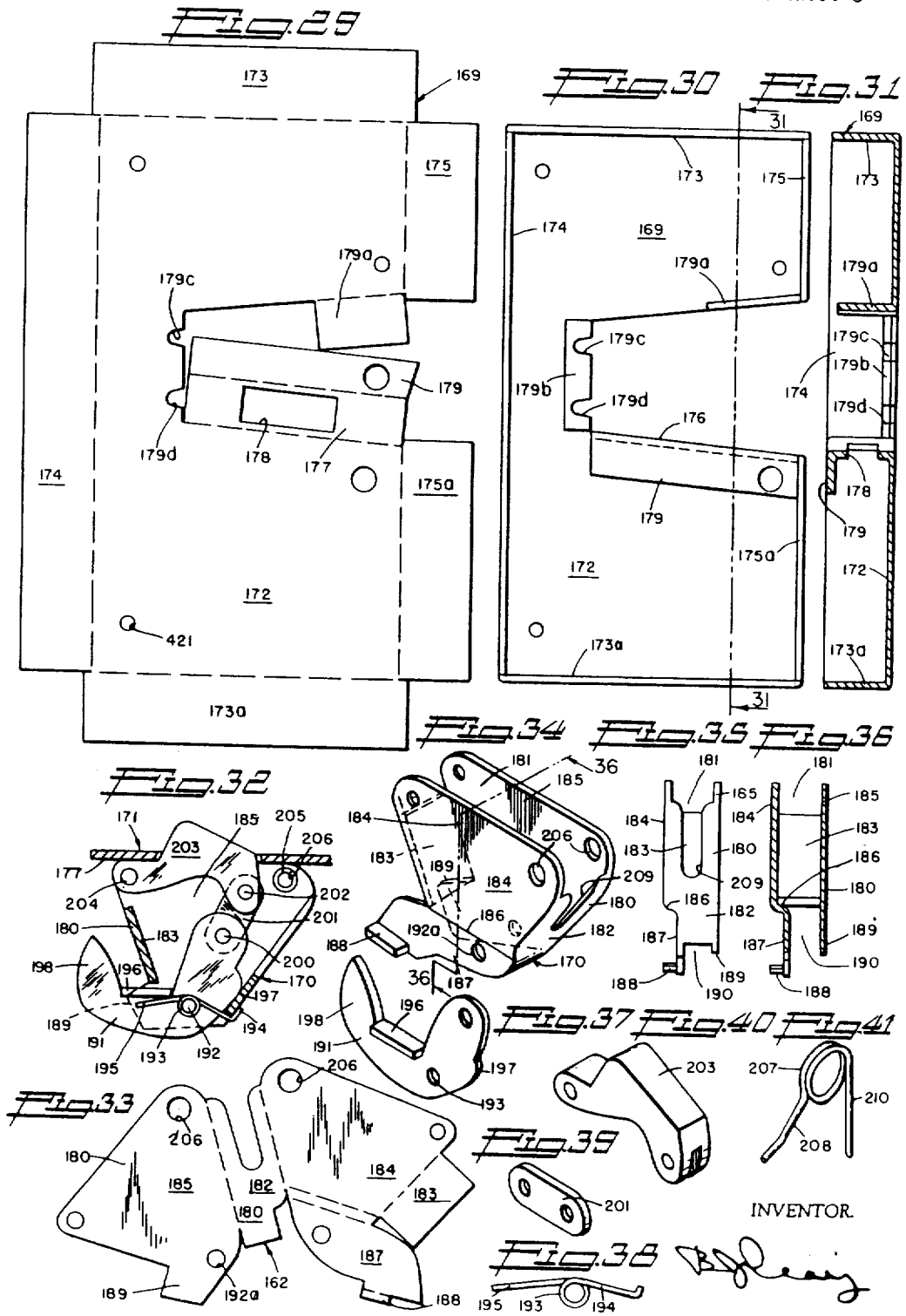

Sept. 28, 1948. B. J. CRAIG 2,450,372
COINCIDENTAL VEHICLE DOOR LOCKING SYSTEM
Filed May 3, 1944 16 Sheets-Sheet 9
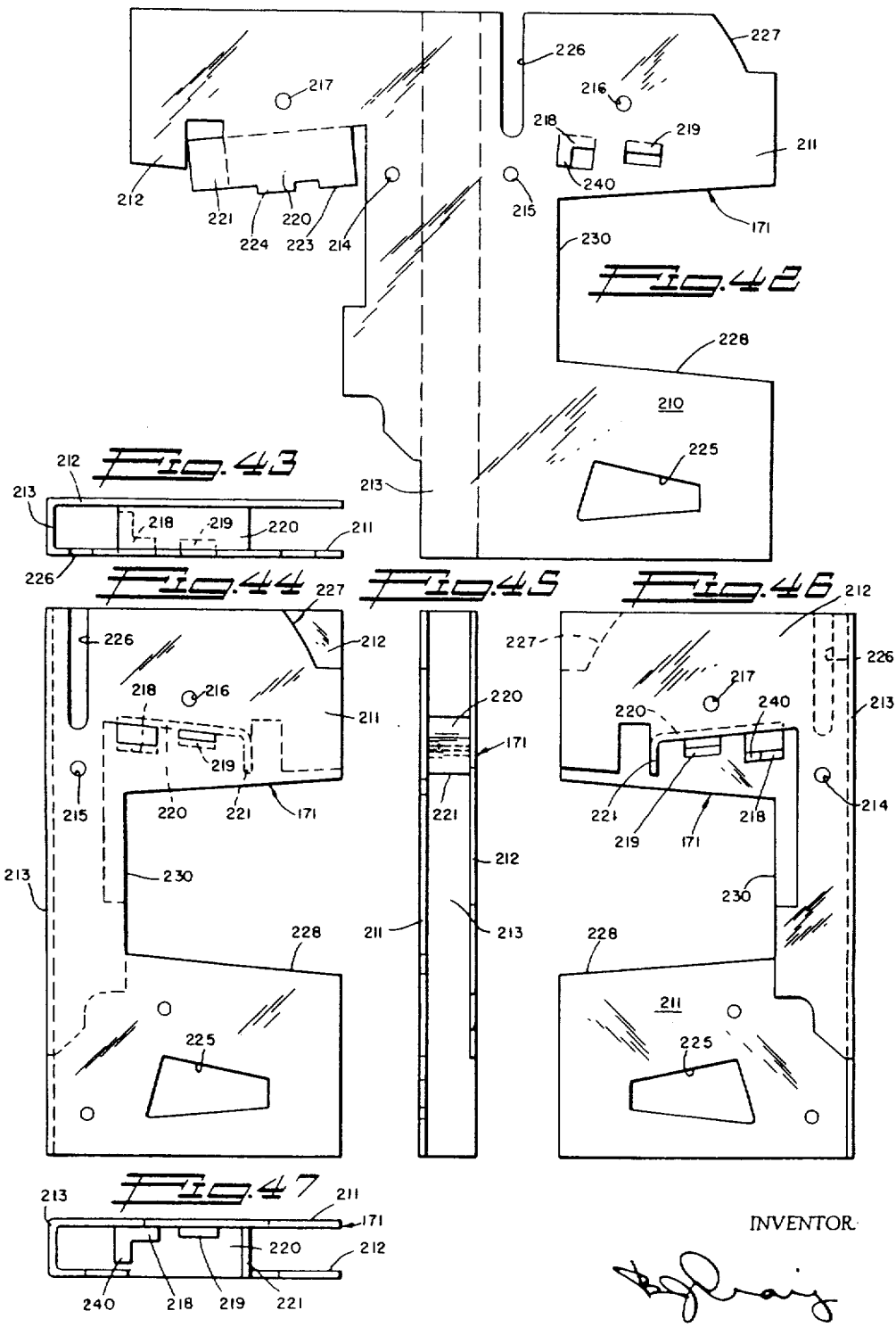
INVENTOR.
B. J. Craig

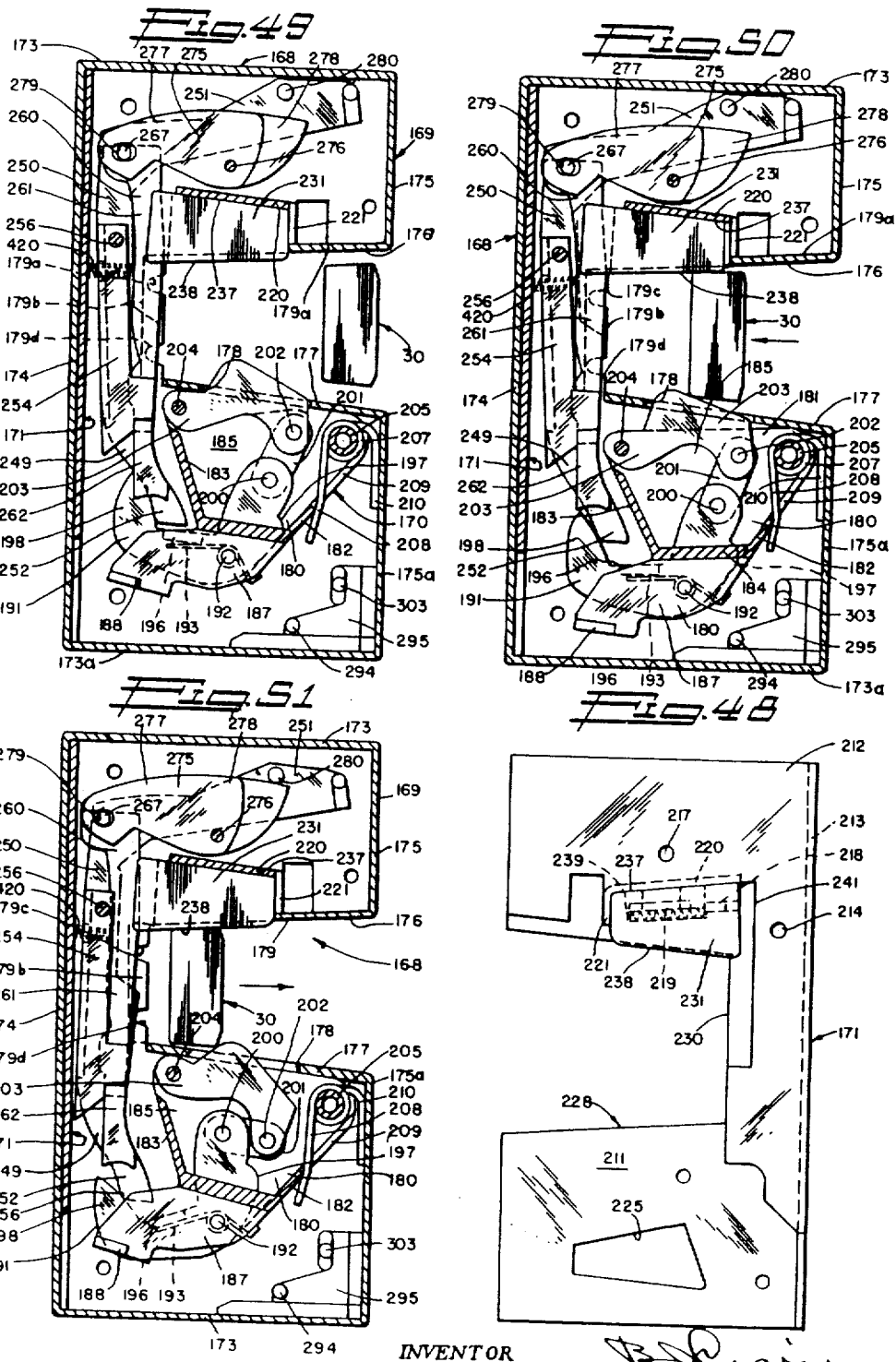

Sept. 28, 1948.  B. J. CRAIG  2,450,372
COINCIDENTAL VEHICLE DOOR LOCKING SYSTEM
Filed May 3, 1944  16 Sheets-Sheet 11
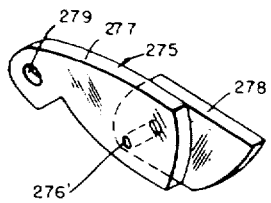
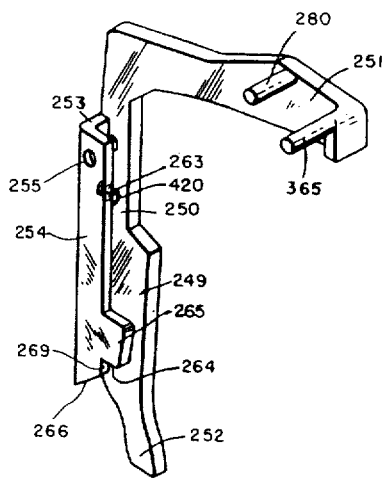
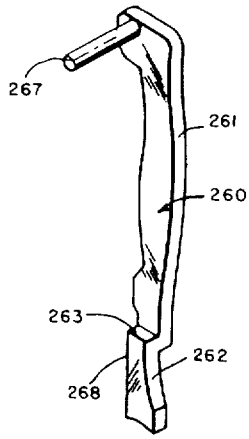
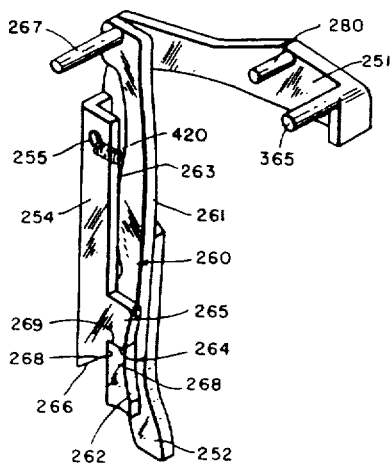
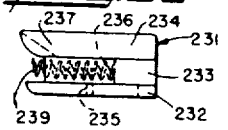
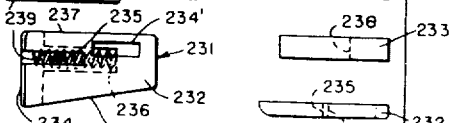
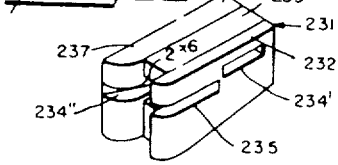
INVENTOR.
B. J. Craig

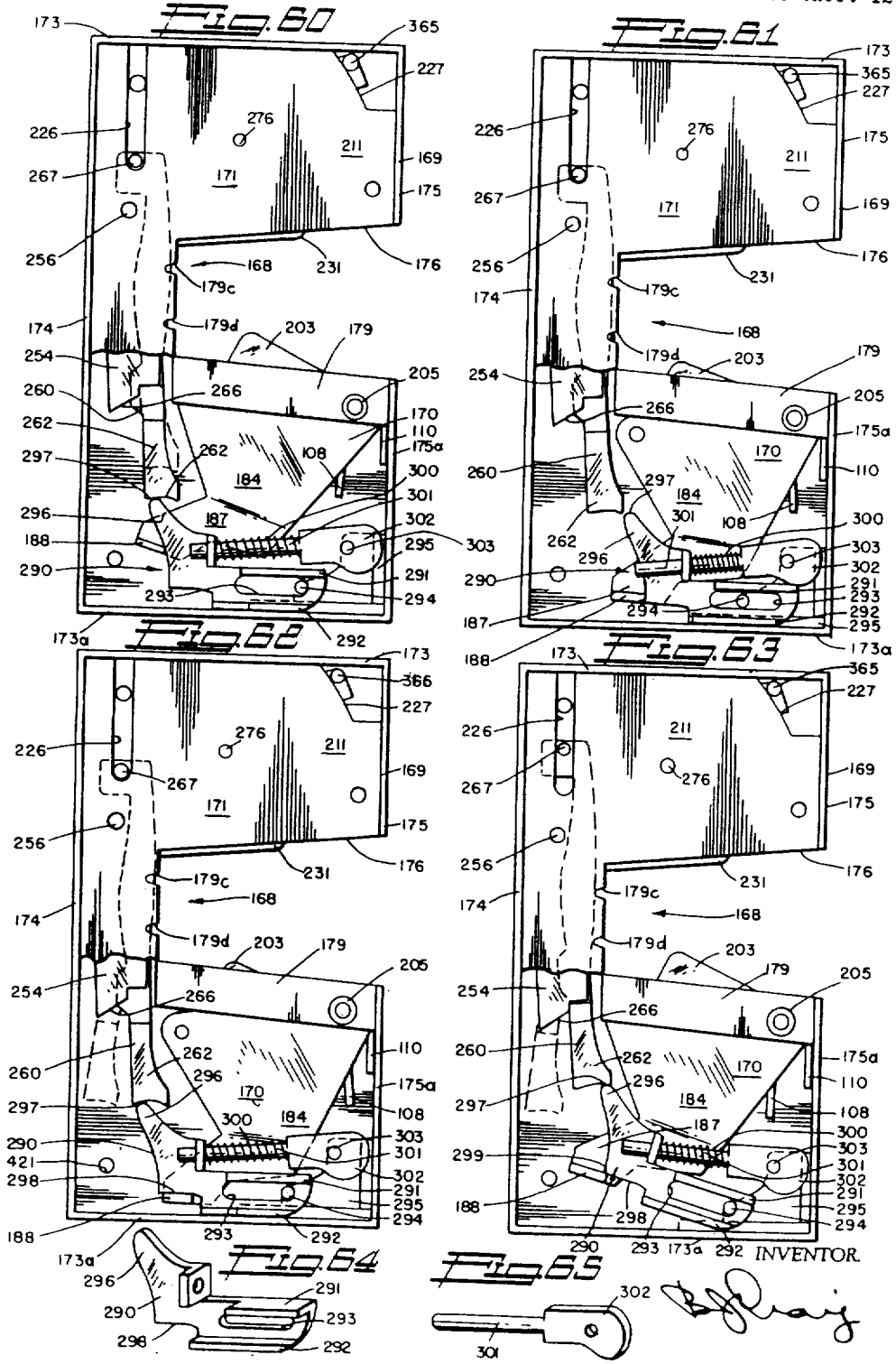

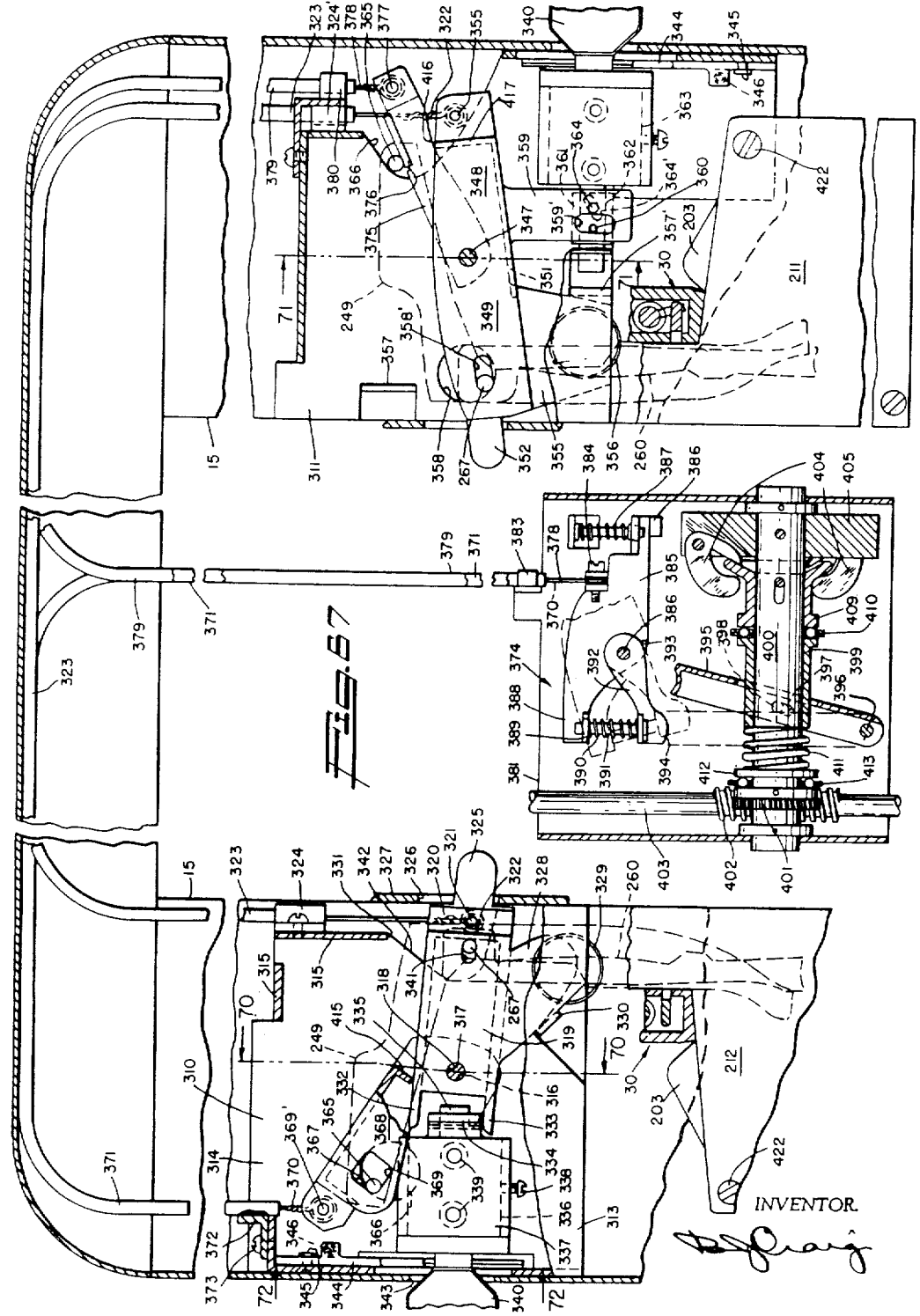

Sept. 28, 1948.         B. J. CRAIG         2,450,372
COINCIDENTAL VEHICLE DOOR LOCKING SYSTEM
Filed May 3, 1944         16 Sheets-Sheet 14
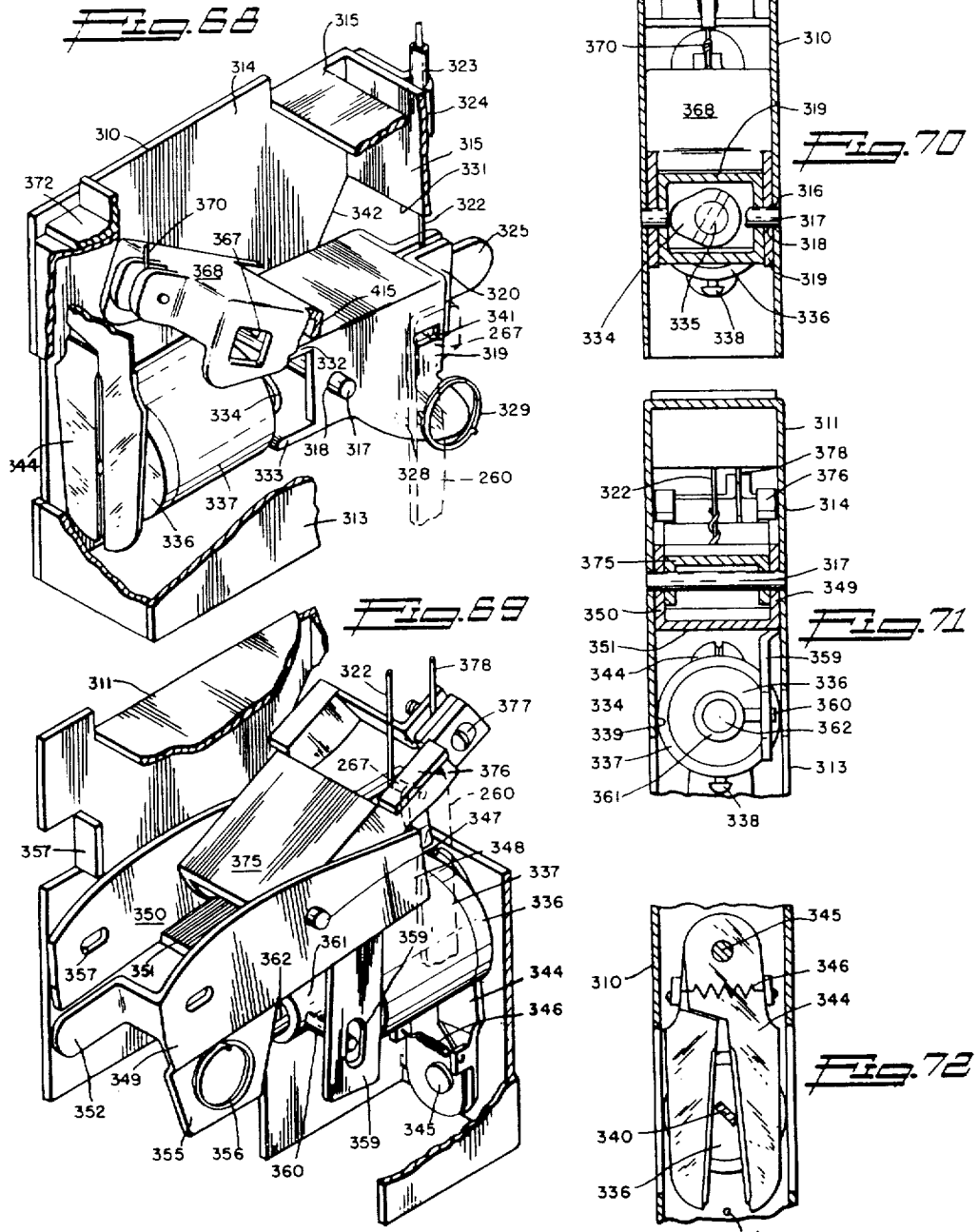
INVENTOR.

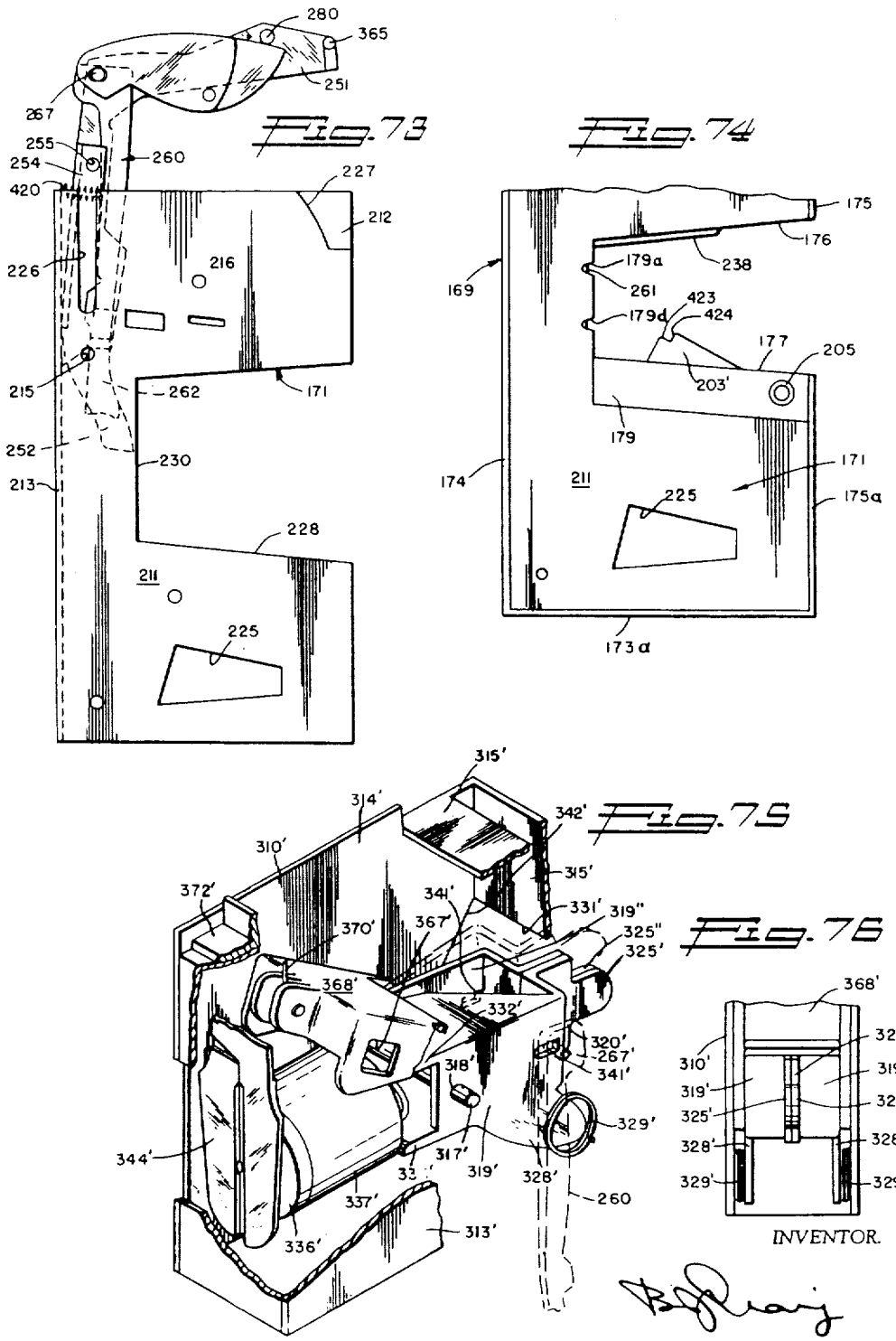

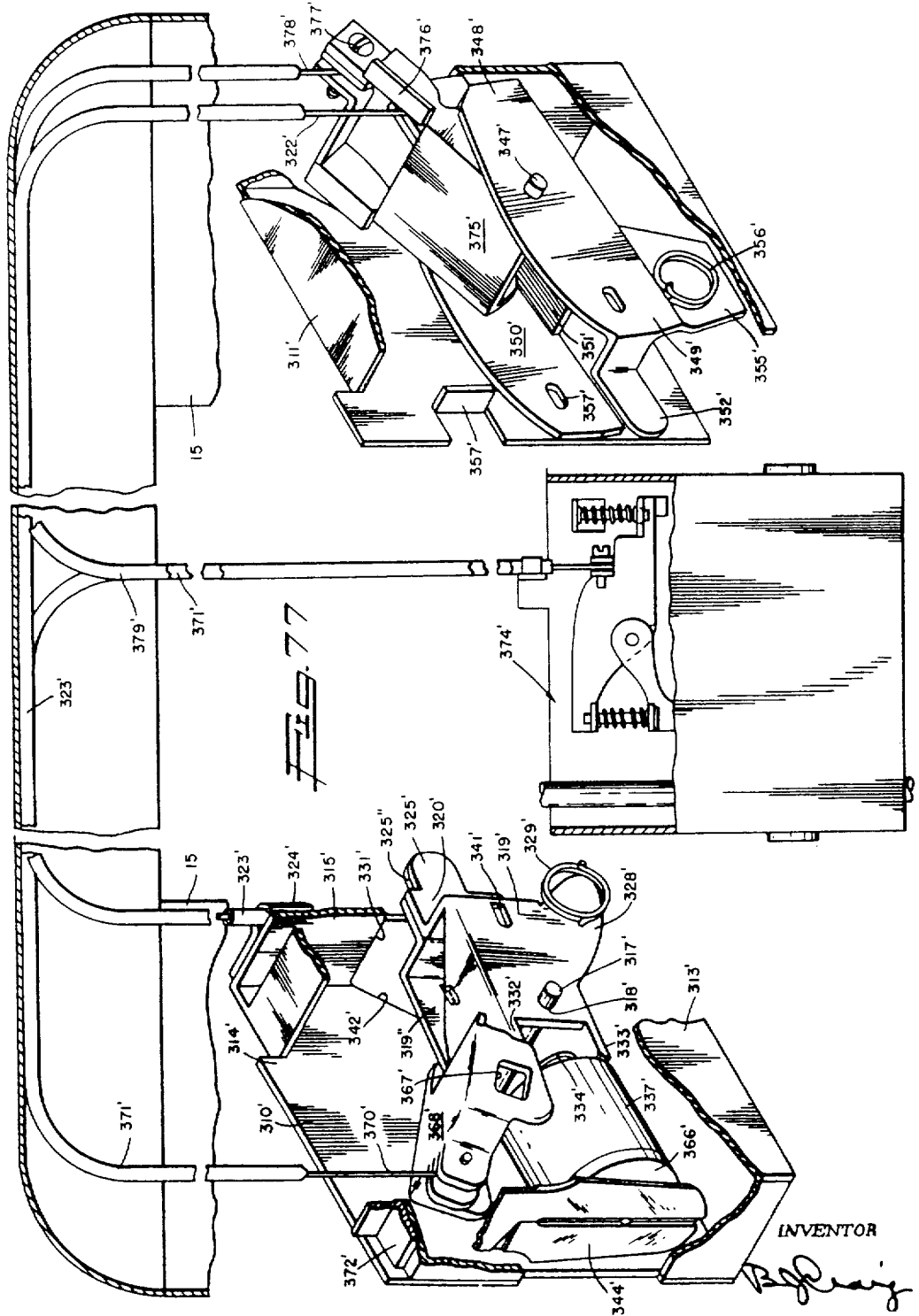

Patented Sept. 28, 1948

2,450,372

UNITED STATES PATENT OFFICE 2,450,372

COINCIDENTAL VEHICLE DOOR LOCKING SYSTEM

Burnie J. Craig, Los Angeles County, Calif.

Application May 3, 1944, Serial No. 533,958

15 Claims. (Cl. 180—82)

This invention relates to a latch mechanism which is particularly, although not exclusively, adapted for use in connection with the doors of automotive vehicles, a general object being to provide a mechanism including cooperating parts adapted to be mounted upon the door and/or frame and/or body pillar with the parts acting in improved and effective manner so that the door may be closed quietly, may be readily locked and may be opened safely and easily.

One consideration which has rendered solution of door securing complicated is due to the fact that both the body pillar and the door pillar must be extremely narrow so that the vision of the driver and other occupants of the vehicle will not be impaired. The window glass guide must be positioned close to the pillar and the control from the outside handle to the latch release must pass between the inner face of the pillar and the adjacent face of the glass guide.

As a result efforts have been directed to construction permitting as narrow uprights between the windows as possible. However, the ordinary lock with the shaft passing through the door cannot be used with a narrow pillar. Hence, various forms of narrow pillar locks have been designed in the last twenty years to allow the operating connections to pass around the sliding window while occupying as little space as possible.

A number of patents have been granted relating to structures for coincidental locks for doors of automobiles, for instance Hardesty Reissue Patent 19,073, and other patents along similar lines. In many of these patents the coincidental locking means positively locks the doors against opening and this is objected to by many riders. Also, most of the coincidental locking systems are complicated and/or are difficult to operate and so have not come into extensive use.

In automotive vehicle door mountings the usual construction provides independent dovetail and latch members, the latch including a bolt member which engages a strike and the dovetail including a socket member on the pillar and a companion projecting member on the door. This construction of dovetail is objectionable since the projecting dovetail member is in the way and is frequently struck by passengers entering and leaving the vehicle and further objection arises from the fact that the dovetail must be kept lubricated so that frequently the passengers' clothes are soiled due to striking the greasy dovetail. A reversal in mounting with the socket member on the door and the projecting companion member on the pillar adds other problems and does not provide a solution.

Efforts have been made to provide a combined dovetail and latch and a number of patents have been granted for such constructions. In these designs, however, the constructions have usually included the feature of using the socket member on the door with the projecting member on the pillar and with the socket member carrying a latch bolt which is movable into a notch on the projecting member. This construction is typified by Kehoe Patent 1,275,700, August 13, 1918. Such constructions do not overcome all of the problems mentioned and add other problems.

The conventional automotive vehicle door latch bolt has been in the nature of a push member which is urged to engaged position by a very strong spring. In opening the door the heavy bolt spring must be compressed by rotating an inside or an outside actuator. The forces involved are such that a very strong support must be arranged for the bolt and for the proper mounting of the handle.

Further, in the conventional latch construction the bolt is mounted on a plate which carries more or less of the control members for the bolt. This plate is mounted on the inside or the outside of the rear panel of the door in such manner that original assembly is troublesome and repairs are difficult and time wasting.

In an automobile the remote inside door handle is usually located where it is readily accessible for operation by a youngster. Many accidents have occurred by youngsters operating the remote inside door handle to unlatch and open the vehicle door while the vehicle was in motion. Other accidents have occurred by occupants unintentionally striking or actuating the remote inside door handle to retract the bolt and throw the door open while the vehicle is in motion.

In many vehicles the doors are made to open from the rear because of the danger of opening a door while the vehicle is travelling, with the result that the passing air column will frequently catch the door and throw it open. This last feature requires that the rear door be hung on the central body pillar thus requiring that this pillar be made much heavier, and further, this compels the rear seat occupants to clamber over the rear fender and clothing is frequently soiled in doing this.

Many persons object to riding in a vehicle the doors of which are locked and therefore it is impractical to provide means to positively lock the car door when the car is running.

The general object of the invention is to overcome or minimize the objections noted and in addition to provide other advantages.

A more specific object of the invention is to provide a novel coincidental door locking system for the doors of an automotive vehicle.

A further object of the invention is to provide a novel coincidental door locking system wherein when the mechanism is in locked condition the shutting of any door will cause the doors to be unlocked and wherein when the mechanism is in locked condition the actuation of a member while the doors are being closed will cause the doors to remain locked.

Another object of the invention is to provide a door securing system including a novel vehicle speed controlled release means for the door latches which may be operated to open a door only with difficulty while the vehicle is in motion but which can be readily operated when the vehicle is still thus avoiding accidental opening or opening by children or others.

Another object of the invention is to provide a door securing means including a novel vehicle speed controlled, bolt release member remote from the door.

A further object of the invention is to provide a novel bolt member for a door latch.

A further object of the invention is to provide a novel rotary remote control member for releasing the latch of an automotive vehicle door.

An additional object of the invention is to provide a bolt including novel release members carried by the bolt and operable to release a latch.

A further object of the invention is to provide a novel outside controlled actuator for a door latch wherein a sliding operator member is employed so that but one layer of material is required between the window run and the outer wall of the door pillar.

Another object of the invention is to provide a novel bolt sub-assembly which can be readily secured in place or readily removed.

Another object of the invention is to provide a novel catch member for use with closures.

A further object of the invention is to provide a catch member including a novel toggle control therefor.

Another object of the invention is to provide a novel catch member housing.

A further object of the invention is to provide a novel blank for making a catch member housing.

A further object of the invention is to provide a novel support for a catch release mechanism.

A further object of the invention is to provide a novel dovetail construction.

A further object of the invention is to provide a novel wedge member for use in a dovetail.

A further object of the invention is to provide a novel means for mounting the wedge member of a dovetail.

A further object of the invention is to provide a novel door securing means wherein a bolt engages a wedge recess and wherein a catch engages the bolt outside of the area of engagement between the bolt and the wedge recess.

An additional object of the invention is to provide a catch member including a novel release therefor.

A further object of the invention is to provide a novel inside door handle and catch release member.

Another object of the invention is to provide a novel outside handle and catch release member.

Another object of the invention is to provide a novel door handle mounting means.

A further object of the invention is to provide a novel catch release member which is adapted to be mounted on a support such as a handle.

A further object of the invention is to provide a novel means for mounting a latch operating member on a door handle.

An additional object of the invention is to provide a novel anatomically correct combined grip and latch releasing member for a vehicle door.

A further object of the invention is to provide a novel handle including means permitting it to be angularly adjusted.

A further object of the invention is to provide a novel means for coupling vehicle speed control members and/or coincidental latch members in a vehicle door securing construction.

Doors frequently stick after the latch is released and an object of this invention is to provide a novel means tending to cause the door to be urged towards open position. In the disclosure this is accomplished by a spring means associated with the bolt and acting when the latch is released in opening the door to initiate opening movement of the door during a very small angular sweep thereof and after a lighter spring partially overcomes door inertia so that the door may be further opened with but little force.

In the disclosure one embodiment of the invention includes door securing means wherein the latch for each door is independently locked by means shown as a manually movable member mounted within the vehicle with the manual means disposed adjacent to each other and having substantially the same path of movement whereby a single movement by an operator, as by sweeping a finger over the members, will cause simultaneous operation of both members to thus simultaneously lock or unlock a plurality of the latch means. In this construction simplification of operating parts is secured and without material sacrifice of operating efficiency.

Other objects and advantages of the invention will be apparent from the following description taken in connection with the accompanying drawings, wherein:

Fig. 1 is a fragmentary side elevation showing a vehicle equipped with latches embodying the features of this invention;

Fig. 2 is a plan view of the bolt support blank;

Fig. 3 is a view similar to Fig. 2 showing the completed support;

Fig. 4 is an isometric view showing the bolt assembly;

Fig. 5 is a side elevation, partly in section and with parts broken away, showing the bolt;

Fig. 6 is a bottom plan view of the bolt looking in the direction of the arrow 6—6, Fig. 5;

Fig. 7 is a section taken on line 7—7, Fig. 5;

Fig. 8 is a section taken on line 8—8, Fig. 5;

Fig. 9 is a view similar to Fig. 8 with the parts in another position;

Fig. 10 is an isometric view with parts broken away showing the manner in which the bolt parts are assembled;

Fig. 11 is an isometric view with parts broken away, showing the outside release member and its mountings;

Fig. 12 is an isometric view, with parts broken away, showing the manner in which the outside release member is assembled;

Fig. 13 is an isometric view showing the outside push release member;

Fig. 14 is an isometric view showing the clip for supporting the outside release member;

Fig. 15 is a sectional view taken on line 15—15, Fig. 1, and on an enlarged scale;

Fig. 16 is a sectional view taken on line 16—16, Fig. 15;

Fig. 17 is a fragmentary top plan view, with parts broken away, showing the outside handle;

Fig. 18 is a view taken on line 18—18, Fig. 15;

Fig. 19 is a view taken on line 19—19, Fig. 18;

Fig. 20 is a section taken on line 20—20, Fig. 18;

Fig. 21 is a sectional view showing the bolt and outside handle mounted upon the door and with the outside release member in catch releasing position;

Fig. 22 is a view similar to Fig. 21 showing the inside release member in catch releasing position;

Fig. 23 is a view similar to Fig. 21 showing the manner in which the outside release member may be operated to catch releasing position while the door is in fully opened position;

Fig. 24 is a sectional view taken on line 24—24, Fig. 16, showing the inside release member;

Fig. 25 is a top plan view showing the inside release member;

Fig. 26 is an extended view showing the elements of the inside release member;

Fig. 27 is a view similar to Fig. 24 showing the members prior to assembly;

Fig. 28 is an isometric view showing the inside release rocker arm;

Fig. 29 is a plan view of the latch housing blank;

Fig. 30 is a view of the latch housing in completed form;

Fig. 31 is a section taken on line 31—31, Fig. 30;

Fig. 32 is a fragmentary section showing the catch casing;

Fig. 33 is a plan view of a blank from which the catch casing is made;

Fig. 34 is an isometric view showing the catch casing;

Fig. 35 is an end view of the catch casing;

Fig. 36 is a section taken on line 36—36, Fig. 32;

Fig. 37 is an isometric view showing the lower catch toggle member;

Fig. 38 is a plan view of the spring for the lower toggle member;

Fig. 39 is an isometric view of the upper toggle member;

Fig. 40 is an isometric view of the catch member;

Fig. 41 is an isometric view showing the latch housing spring;

Fig. 42 is a plan view of the blank for the catch release arm support;

Fig. 43 is a top view of the catch release arm support after the blank shown in Fig. 42 is folded;

Fig. 44 is a front view of the catch release arm support;

Fig. 45 is an edge view of the catch release arm support;

Fig. 46 is a rear view of the catch release arm support;

Fig. 47 is a bottom view of the catch release arm support;

Fig. 48 is a view similar to Fig. 46 showing the dovetail member in fitted position;

Fig. 49 is a sectional view through the latch housing with the catch release arm therein and showing the parts in the position they occupy when the bolt is aproaching latching position and before the bolt strikes the catch;

Fig. 50 is a view similar to Fig. 49 showing the bolt striking the catch and depressing the latter;

Fig. 51 is a view similar to view 49 showing the position taken as the bolt moves outwardly (with the toggle broken) and the catch moving with the bolt;

Fig. 52 is an extended view showing the elements of the dovetail member;

Fig. 53 is a side elevation of the dovetail member in assembled form;

Fig. 54 is a bottom view of the dovetail member;

Fig. 55 is an isometric view of the dovetail member;

Fig. 56 is an isometric view showing the release arm;

Fig. 57 is an isometric view showing the slide arm;

Fig. 58 is an isometric view showing the release arm and slide arm in operative relation;

Fig. 59 is an isometric view showing the unlocking arm;

Fig. 60 is a rear elevation of the latch housing with parts broken away to show the details of the locking arm return member and showing the return member in normal position;

Fig. 61 is a view similar to Fig. 60 showing the locking arm return member being retracted by depression of the catch;

Fig. 62 is a view similar to Fig. 60 showing the locking arm return member advanced to normal position while the catch is still depressed;

Fig. 63 is a view similar to Fig. 60 showing the locking arm release member being raised as the catch rises;

Fig. 64 is an isometric view showing the locking arm return member;

Fig. 65 is an isometric view showing the unlocking member spring guide;

Fig. 66, sheet VI, is a view similar to Fig. 49 showing the actuating arm depressed and in the act of rocking the catch release arm and thereby breaking the toggle and releasing the catch;

Fig. 67 is a sectional view with parts broken away and with parts in elevation showing the coincidental locking mechanism and the speed controlled mechanism;

Fig. 68 is an isometric view with parts broken away showing one of the coincidental locking and speed controlled devices;

Fig. 69 is a view similar to view 68 showing the other locking and speed controlled device;

Fig. 70 is a section taken on line 70—70, Fig. 67;

Fig. 71 is a section taken on line 71—71, Fig. 67;

Fig. 72 is a section taken on line 72—72, Fig. 67;

Fig. 73 is a plan view showing the manner in which parts are assembled;

Fig. 74 is a fragmentary elevation showing a modified catch member;

Fig. 75 is a view similar to Fig. 68 showing a modified control mechanism wherein the latches are independently locked and unlocked;

Fig. 76 is a fragmentary elevation showing parts of the modified control mechanism;

Fig. 77 is a view partly isometric and partly in section, with parts broken away, showing a semi-coincidental locking speed controlled latch device.

In the accompanying drawings the invention is shown as embodied in an automotive vehicle door latch which is indicated generally at 10.

A latch is provided for each front door 11 and each rear door 12 of a four-door sedan type automotive vehicle 13 although the invention is adapted for use with other types of vehicles having more or less than four doors. The doors are mounted on hinges 14 for movement towards and from body pillars 15. The latches 10 for the front and rear doors are preferably identical with each other except for the fact that they are rights and lefts.

Each latch 10 includes a support or base plate 16 which may be made from a blank as shown in Fig. 2. The support includes a body portion 17 from which vertical side flanges 18 extend. These flanges 18 converge towards one end of the body and decrease in height towards the converging end. A selvage plate 19 is bent up from the body portion 17 and is provided with a slot 20 through which a bolt member (to be later described) reciprocates. The sides 21 of the slot 20 converge towards the body 17. The selvage plate includes apertures 22 through which fastening members may extend.

Opposite the selvage plate 19 the body includes an inner end wall 23 which has a hole 24 therein. Between the flanges 18 and the end 23 I provide inner flanges 25 which are arranged perpendicular to the base plate 16 and have their upper ends 26 bent inwardly in parallel relation to the base to form wings. The body portion 17 is provided with a tongue 27 which is struck therefrom and which is bent slightly inwardly when the parts are assembled as shown in Fig. 15. The tongue 27 serves to hold the parts assembled and to limit the forward movement of the bolt as will be later described.

The support 16 receives a bolt 30 (Fig. 10) which includes side rails 31 and 32, a front end 33, a rear partition 34 and an intermediate partition 35. The partitions 34 and 35 are provided with outwardly opening slots 36 and 37 and the front 33 is provided with a short, inwardly extending sleeve 38 (see Figs. 6 and 15). The rails 31 and 32 are reduced in height at their inner ends as at 39 and 40.

The bolt is of rectangular form and the front portion is bevelled slightly as at 41 to fit the bevelled edges 21 of the slot 20.

The lower face of the bolt at one end is provided with an inner closure member 42 (Fig. 5) and an outer closure 43 (Fig. 4) which may be shorter than the member 42. The various parts of the bolt may be secured in place as by welding or the bolt may be a die casting. The member 42 is provided with a pair of slots 44 and 45 which extend rearwardly from the front end 33 of the bolt. The closure 43 is provided with a slot 46 which opens rearwardly and which is aligned with the slot 44 previously mentioned.

An actuating arm 47 is pivoted as at 48 at one side of the bolt on the rail 31 and a second actuating arm 49 is pivoted as at 50 to the other rail 32 of the bolt. The arm 47 extends rearwardly at 1 beyond the pivot 48 and this rearwardly extending portion, when the bolt is assembled on the support 16, engages the support and limits upward movement of the outer end of the arm 47 from the position shown in Fig. 4.

The arm 47 includes an ear 52 which fits in the slot 44. The arm 47 just above the ear 52 is flat as at 53 (Fig. 10) and this flat portion merges into an inclined portion 54, the purpose of which will be presently described. The arrangement is such that when the arm 47 is pushed inwardly the ear 52 will project through the slot 44 as shown in Fig. 21.

The arm 49 includes an ear 55 which projects through the slot 45. The arm 49 includes a notch 56. The inner end of the notch 56 is defined by a sloping wall 57.

In order to operate the arm 49 I provide an operating member 60 (see Fig. 10) which may be a rod and which includes a forward end portion 61 adapted to slidably fit in the sleeve 38. The member 60 includes a collar 62 held in place as by a pin 63 which engages a relatively heavy spring 64. This spring 64 engages the partition 35 and normally urges the collar 62 and the rod 60 rearwardly to the position shown in Fig. 4. In this position the ends of the rails 31 and 32 engage the end member 23 on the support 16.

Near the front end the member 60 includes an outwardly projecting ear 65 which fits in the slot 56 after the parts are assembled. When the rod 60 is turned the ear 65 engaging the lower wall of the slot 56 moves the arm 49 downwardly causing the ear 55 thereon to project beyond the slot 45 (see Fig. 9) and to perform a latch releasing operation as will be hereinafter described.

To assemble the bolt the arms 47 and 49 are preferably first secured in position and thereafter the rod 60 is moved to the position shown in Fig. 10 with the forward end of the spring 64 engaging the partition 35 and with the tongue 65 ready to slide down the inclined portion 57 of the slot 56. The rod 60 is then moved forward, compressing the spring 64, and as it does this the tongue 65 moves into the slot 56 and the forward end 61 of the rod enters the sleeve 38 previously described. When this is done the collar 62 on the rod 60 will have just passed beyond the partition 34 whereupon the rod 60 will be lowered so that it fits within the slots 36 and 37 with the spring 64 urging the collar 62 rearwardly and thereby urging the rod 60 rearwardly.

The collar 62 is so arranged that when it is urged rearwardly against the partition 35 the front end 61 of the rod 60 will be spaced slightly from the inner wall of the front 33 as shown in Fig. 6. The flat portion of the slot 56 is longer than the width of the tongue 65. This permits the tongue 65 to move forward slightly when the bolt 30 is held against advancing by the tongue 27 and the rod 60 is pushed causing the spring 64 to be compressed. The purpose of this action will be presently described.

The bolt is assembled by inserting the rod 60 through the slot 20 and then moving the rod and bolt rearwardly until the rod passes through the hole 24 and the inner ends of the rails 31 and 32 engage the end 23 of the support. In this position the notches 39 and 40 on the rails 31 and 32 of the bolt will fit beneath the wings 26 on the support and at the same time the front 33 of the bolt will be flush with the outer face of the selvage plate 19.

After the bolt is thus assembled the tongue 27 is pushed upwardly slightly so that it is in the position shown in Fig. 15 where it engages the front face of the partition 35 when the bolt is moved forwardly. Thus it will be seen that the parts merely have to be inserted in place and the tongue 27 bent slightly to provide a complete bolt assembly.

The bolt assembly, which is indicated generally at 70 and which is best shown in Fig. 4, further includes a tubular member 71 which is secured to the rod 60 as by a removable pin 72. The forward end 73 of the tubular member 71 is spaced from the closure 23 of the support 16. A spring 74 has its forward end engaging the end 23 on the support 16 and its rear end engages the adjacent end 73 of the tube 71. This normally causes the tube 71 to be forced in a direction away from the end 23. The tube in turn pulls the rod 60 and the latter causes the bolt 30 to be normally urged inwardly along its support 16 to the position shown in Fig. 4.

The bolt assembly 70 further includes an inside handle supporting plate 75 which includes a base 76 and an end flange 77. The portion 77 has a hole 78 therein through which the tubular member 71 extends. The base 76 includes a threaded collar 79. The tubular member 71 has a sleeve 80 therein which is held in place by a pin 81. The sleeve 80 includes an arm 82 which is aligned with the collar 79. The arm 82 is adapted to be engaged and rocked by means to be later described.

In the illustrations each door is provided with a slot 83 (Figs. 16 and 18) in its front panel 84. Each slot 83 is of a size to receive the selvage plate 19 on the associated bolt assembly. On the inner face of each door panel 84 a pair of handle support plates 85 and 86 are held in place by spot welding as at 87. These plates 85 and 86 are spaced apart to provide a slot 88. The plates are notched at 89 to receive the bolt 30 and are cut away as at 90 to receive the flanges 18 on the base 17.

The plates 85 and 86 are provided with rails 91 and 92 respectively (see Figs. 11 and 18) which overhang the adjacent parts of the front door panel to form slots 93.

In assembly the support is moved rearwardly until the selvage plate 19 thereon engages the front face of the plates 85 and 86 with the selvage plate 19 fitting the slot 83. Suitable fastening means such as screws 94 are then inserted through the holes 22 in the selvage plate and pass into threaded holes in the plates 85 and 86. Thus the bolt support and bolt assembly are held against outer movement by the screws and against inner movement by engagement with the plates 85 and 86.

The bevelled converging flanges 18 of the support 16 are arranged beneath ears 95 on flanges 96 integral with plates 97 which are secured to the inner face of the inside panel 98 of the door as by welding at 99. The flanges 96 converge inwardly and the ears 95 incline downwardly and inwardly so that the flanges 18 on the bolt support are tightly wedged in place.

In moving the bolt assembly into place, the inner end of the tubular member 71 which is closed and rounded as at 100 passes through a circular hole 101 in the inner end panel 102 of the door so that it will engage the hinge pillar 103 as shown in Fig. 15 and Fig. 16. A pin 104 holds the plate 75 on the tube 71.

The construction is such that as the door is opened the spring 74 pushes the tubular member 71 and the rod 70 towards the hinged side of the door thereby causing the collar 62 to retract the bolt so that the front face 33 of the bolt is flush with the outer face of the selvage plate 19 and with the outer face of the door. It takes this position when the door is partly opened so that the bolt is not in a position where it will be struck by a person entering the vehicle, and, further, there will be no greasy projecting member for the passenger to strike thereby causing his clothing to be soiled.

In order to shift the arm 43 and cause the ear 48 thereon to project through the slot 40 and thus actuate a catch member which will be later described, a handle assembly is provided. This assembly is indicated generally at 105 (see Figs. 11 and 12) and includes a body 106 shown as made from a single piece of material and including a grip portion 107 and an attaching portion 108. The forward end of the attached portion 108 has bevelled sides 109.

The walls of the plates 85 and 86 converge as shown at 110, Fig. 18, to correspond with the bevel 109 on the handle securing portion. The portion of the handle adjacent to the bevelled portion 109 is of substantially the same thickness as the depth of the slots 93 defined by the rail members 91 and 92 and thus the handle portion may be inserted beneath these members 91 and 92 with the bevelled end 109 providing a tight fit. A screw 111 (Fig. 15) is then inserted through a hole 112 in the end panel of the door and into a threaded hole 113 in the handle portion 108. Thus a single screw may serve to hold the handle in operative position.

The handle includes a U-shaped housing portion 114 which fits into the adjacent portions 107 and 108 of the handle and may be welded in place. The inner end of the portion 114 is open. The handle includes a slot 115 arranged in the portions 107 and 108.

A bolt actuating member, indicated generally at 116 (Fig. 12), includes a body portion 117 which includes spaced wings 118 and a forwardly projecting portion 119 having an offset end portion 120 which terminates in a reduced tip 121. The portion 108 of the handle is slotted as at 122 and beyond the slot is provided with an end flange or tongue 123. The wings 118 are pivoted to the sides 124 of a push member 125 (Figs. 12 and 13) by a pin 126 which fits into holes 127 in the member 125. The push member 125 is of a size to slide in the slot 115 and normally projects as shown in Fig. 11 so that it is accessible for actuation.

The push member 125 has a hole 128 which receives a pin 129. This pin 129 is mounted in holes 129' in a U-shaped member 130 (see Fig. 14). The U-shaped member is cut away as at 131 so that it may slide into the housing portion 114 of the handle. The outer end 132 of the member 130 when assembled is flush with the end 133 of the housing, so that when the housing is in position upon the door the U-shaped member is held in place. A spring 134, Fig. 21, surrounds the pin 129 and engages the portion 117 and the push member 125 to urge the latter to projecting position.

When the member 125 is depressed the tip 121 on the body portion 117 will enter the slot 46 of the bolt and will engage the arm 47 to actuate the latter (see Fig. 21) to release a latch device to be later described. A spring 135 surrounds the rod 60 and its end engages the arms 45 and 47 and normally urges these arms to retracted position.

In order to turn the rod 60 and cause the ear 65 to move the arm 49 so that the ear 55 projects through the slot 45 to thus actuate a latch releasing member, which will be presently described, an inside latch release member is provided and is indicated generally at 140 in Figs. 24 and 25.

As shown the device 140 includes a grip portion 141 and a portion 142 which has a slot 143 through which a finger tip release member 144 protrudes. The member 144 is shown as mounted on a tubular member 145 which has a plane lower end 146 and is internally threaded at 147 to receive a threaded sleeve 148.

The threaded sleeve 148 engages the inner end 149 of a U-shaped support 150. This support 150 carries a pin 151 which supports the finger tip release member 144. A spring 152 engages the member 144 and the inner wall of the portion 145 to normally urge the member 144 to protruding position.

The sleeve 148 engages the threads of the collar 79 so that when the handle is rotated the threads will cause the end 146 on the handle to approach the adjacent panel 84 of the door.

An escutcheon plate 153 is arranged about the member 145. This plate includes an internal flange 154 which is arranged beneath the face 146 and is engaged by a corrugated spring washer 155. The washer 155 is compressed as the handle is rotated thus clamping the escutcheon in place and holding the plate 76 in place to complete the assembly.

The sleeve 148 and the tubular member 145 have aligned apertures 156 and 157 through which the tip 158 of a spring 159 extends. This tip 158 prevents relative rotation between the parts 145 and 148. The tip 158 also is arranged in any one of a series of holes 160 in the escutcheon so that relative rotation between the escutcheon and the handle portion 145 is prevented.

The escutcheon includes a downwardly projecting tongue 161 which extends through aligned holes 162 in the front panel of the door and in the plate 76 so that rotation of the escutcheon is prevented.

The tip 158 of the spring enters the hole 160 in the escutcheon when the threaded parts have been relatively advanced sufficiently whereupon the whole assembly will be held in place.

To release the handle the tip 158 of the spring is pushed inwardly until it frees the escutcheon whereupon the handle may be unscrewed.

The release member 144 includes a pin 163 which pivotally supports a push arm 164. The arm 164 extends through a hole 165 in the end 149 of the member 150. The arm 164 is offset from the pin 163 and is coaxially disposed with respect to the members 145 and 148 so that it may be turned with these members. The inner end of the arm 164 is rounded as at 166 and fits within a groove 167 in the member 82.

After the parts are assembled pressure on the push member 144 will rock the arm 82 thereby rotating the tube 71 and the rod 60, to move the arm 49 and cause the ear 55 to release the latch to be presently described.

The escutcheon holes 160 provide for adjustment of the handle position since by inserting the tip 158 of the spring in different holes different angle positions of the grip member 141 may be secured. Some people prefer a vertical arrangement of the inside handle while others prefer an inclined or a horizontal arrangement and the construction in a very simple manner provides for this desired adjustment.

The catch device referred to above is indicated generally at 168 (Fig. 49). As shown, this device includes a catch housing, indicated generally at 169, a catch casing, indicated generally at 170 and which is pivoted to the catch support housing, and a support which is indicated generally at 171 and is arranged in the catch support housing and which serves to support the catch release arm.

The catch housing 169 (see Figs. 29 and 30) is preferably made from a blank which includes a rectangular body portion 172 having bent up end flanges 173 and 173a and having an edge flange 174. Opposite the flange 174 the body 172 has upper and lower edges flanges 175 and 175a which are separated, when the blank is bent to completed form, by a tapering slot 176.

At the lower side of the slot 176 a flange 177 is bent up at right angles to the body and this flange 177 is provided with a rectangular slot 178 through which a catch, later to be described, projects. From the flange 177 a second flange 179 extends and is bent at right angles to the flange 177 as shown in Fig. 31. Opposite to the flange 177 a short flange 179a is bent up perpendicular to the body 172.

The body at the inner end of the slot 176 is shown as reinforced by a strip of metal 179b which may be spot welded in place. This layer of metal 179b as well as the portion of the body adjacent thereto is provided with spaced upper and lower slots 179c and 179d into which the ears 52 and 55 on the bolt project when they are moved to catch releasing position. The meeting edges of the housing flanges may be suitably secured together by welding if desired or the entire catch support housing may be made as a die casting or in any other suitable manner.

The catch housing, which is indicated generally at 170 (see Fig. 34), includes a body 180 which has an open top 181, downwardly converging ends 182 and 183, and parallel front and back 184 and 185. The lower part of the front 184 is bent inwardly at 186, thence downwardly at 187 and at its lower end has a tongue 188 thereon. The back 185 of the body is continued downwardly to form a lip 189 which overlies a portion of the part 187.

The casing construction provides a slot 190 through which one link 191 of a toggle extends. The link 191 is pivoted on a pivot pin 192 which passes through aligned holes 192a in the parts 187 and 189. A spring 193 surrounds the pivot 192 and has one end 194 thereof engaging the lower part of the end 182 while the other end 195 of the spring engages a flange 196 on the link 191. The link 191 has a shoulder 197 which engages the end 182 of the casing and limits the straightening or "making" movement of the toggle which includes the link 191. The spring 193 normally urges the link 191 to toggle "making" position.

The link 191 is provided with an end 198 which is adapted to be engaged and shifted by a catch release member to be presently described. The inner end of the toggle link 191 is connected by a pin 200 to a link 201 which in turn is pivotally connected by a pin 202 to a catch 203. The catch 203 is pivoted to the front 184 and the back 185 of the casing 170 by a pin 204 and the catch is so shaped that it normally assumes the position shown in Fig. 32.

The body casing 180 is pivotally mounted on a sleeve 205 which extends through aligned apertures 206 in the casing and may have its ends spun out to hold the tube in place. The catch 203 projects through the slot 178 as shown in Fig. 49. A spring 207 surrounds the tube and has one end 208 which extends through and engages the inner end of a slot 209 in the end 183 of the casing. The other end 210 of the spring engages the inner face of the flange 175a.

The construction is such that the catch casing 170 is normally urged upward by the spring 207 and the catch is normally held so that it projects through the slot 178.

The bevelled sides of the bolt 30 have substantially the same slope as that of the faces of the slot 176 and when the bolt 30 moves inwardly from the position shown in Fig. 49 to the position shown in Fig. 50 the catch casing 170 is swung about the axis of the sleeve 205 as shown in Fig. 50. In the operation the toggle does not break so that the catch 203 remains in the same position relative to the casing 170. As soon as inward movement of the bolt 30 causes the bolt to clear the catch 203, and this occurs when the door is closed, the catch 203 springs up across the path of the bolt and holds the bolt securely in door closed position.

When the link 191 of the toggle is rocked by means to be presently described, the toggle will be broken and the force exerted by the bolt 30 will swing the catch 203 about the pivot 204 of the casing, as shown in Fig. 51 wherein the door has just started to open, the bolt 30 is partly released, and the toggle partly broken. Further outward movement of the door carries the bolt with it and causes the toggle to be completely broken to allow full release of the bolt. During this catch releasing operation the casing 170 is held in its normal position by the spring 207. As soon as the bolt has cleared the catch the latter will return to the position shown in Fig. 49 provided in the meantime the latch releasing member, to be presently described, has released the link 191.

It will be noted that the catch engages the bolt outside of the zone of engagement between the bolt and the tapering slot 176 and as a result the full width of the bolt engages the slot walls, thus excessive wear does not occur at any one point.

The support 171 for the catch release arm is made from a blank 210 shown in Fig. 42 as including a front portion 211 and a rear portion 212 and an end 213. The blank includes aligned apertures 214 and 215 while the front includes another aperture 216 and the back another aperture 217. The front has punched out tongues 218 and 219. The back further includes a tongue 220 which has a wing 221 on the end thereof.

The blank is bent into the form shown in Figs. 43 to 47, inclusive, with the tongues 218 and 219 extending perpendicular to the back. The tongue 220 has small end tongues 223 and 224 thereon which are arranged in the slots from which the tongues 218 and 219 are bent. The wing 221 is bent at substantially right angles to the tongue 220.

The front is provided with an aperture 225 and with an elongated slot 226, the latter extending from the upper edge of the front. The front is cut away as at 227 for a purpose to be presently described. The front of the support 171 is provided with a bolt receiving slot 228 the edges of which converge towards a rear edge 230.

A dovetail member is indicated at 231 (see Figs. 52-55). This dovetail may be made as a die casting or otherwise although it is shown in the accompanying drawing as made from three blanks of sheet material, 232, 233 and 234. The blank 232 has a closed slot 234' therein and has an open ended slot 235 spaced inwardly from the slot 234'. The blank 233 has an open ended slot 236 which is aligned with, and larger than, the slot 235. The blank 234 has a slot 234''. The layers 232, 233 and 234 are superimposed and are secured together as by spot welding.

The dovetail includes a face 237, Figs. 48 and 49, which engages the flange 220 on the support 171 and has an outer face 238 which is adapted to be engaged by the bolt 30 when the latter moves into engaged position. The tongues 218 and 219 on the support 171 fit in the slots 235 and 234' respectively, on the dovetail and serve to hold the dovetail in assembled position and to guide the dovetail in its sliding movement parallel to the flange 220. To permit the sliding action the slot 234' is longer than the tongue 219 which fits in it.

The slot 236 receives a spring 239 which engages an upwardly directed end portion 240 on the tongue 218 and serves to normally urge the dovetail outwardly to the position shown in Fig. 49. When the bolt 30 strikes the dovetail it slides the dovetail along the flange 220 which latter slants outwardly and whenever any loose play occurs the spring 239 pushes the dovetail back into tightly wedged engagement with the bolt. The dovetail is limited in its forward movement by the flange tongue 221 and in its rearward movement by engagement with the tongue 219 and with the adjacent portion of the rear portion 213 of the support 171 at 241 (Fig. 48).

In order to release the catch 203 to free the bolt 30 the toggle link 191 must be rocked. In the disclosure this rocking action is accomplished by a release arm which is indicated generally at 249 (see Fig. 56). This arm is of general L-shape and includes a body portion 250 and a lateral portion 251. The body portion 250 has a lower tongue 252 which is normally disposed adjacent to the tip 198 of the link 191 (see Fig. 49). The arm 250 includes a flange 253 and a portion 254 integral with the flange and overlying the body 250. The portions 250 and 254 have aligned apertures 255 which are aligned with the apertures 214 and 215 in the catch release arm support 171. A pin 256 in the apertures 214, 215 and 255 pivotally supports the body portion 250.

The construction is such that when the body portion 250 is rocked about its pivot the tip 252 will move from the position shown in Fig. 49 to the position shown in Fig. 51 wherein the arm 191 has been rocked by engagement at 256 with the tongue 252 thus breaking the toggle and allowing the bolt 30 to rock the catch 203 about the pivot 204 and allowing the bolt to move outwardly without shifting the casing body 180. This movement of the member 250 may be accomplished by operation of the inside handle push member 144, which rocks the arm 49 and causes the ear 55 to project through the slot 45 and enter the slot 179c in the housing 169 to engage and rock the member 250.

Thus it will be seen that the operation of the inside handle will free the catch 203 so that the bolt may be moved with the door and the door opened. As the door opens the bolt is freed from the dovetail 231 and is free to be retracted by the spring 74 so that it is moved out of the way before the door is opened wide enough for a passenger to enter or leave the vehicle.

In order to provide for opening of the door by means of the outside actuator the disclosure includes a slide arm 260 (Fig. 57) which includes a body portion 261 having an offset lower end tongue 262. The body 261 slides in the slot 263 between the portions 250 and 254 of the arm 249, Fig. 58. The shoulder 263, provided by the offset portion 262 when the slide is in upper position, engages a lower shoulder 264 on a tongue 265 upon the portion 254 and thus limits upward movement of the slide 260.

In its lower position the slide shoulder 263 passes beyond a bevelled portion 266 on the lower end of the part 254. The slide arm 260 is pivoted to turn about a pin 267 on the arm. The pin in the assembly is disposed in the slot 226 of the front 211 of the member 171 previously described. The pin 267 allows the slide arm 260 to pivot when the latter is in the up or in the down position.

When in its upper position the arm 260 is free to rearwardly turn about the pivot but is restrained from this movement without also moving the arm 250 due to the engagement of the portion 268 immediately below the shoulder 263 with a plane 269 on the arm portion 254 and between the shoulder 264 and the upper end of the bevelled part 266. When the arm 260 is moved to its downward position the member 260 is free to move rearwardly without moving the arm 250. Thus the slide arm 260 functions as a lock member since in one position its movement rocks member 250 to release the catch and in another position its movement has no effect on the member 250 and hence, when moved while in the second position, it does not release the catch.

When the slide arm 260 is in its lower position and when it is moved rearwardly with the shoulder 263 below the cam 266 (and when the slide arm 260 is then raised, as will be later described) the shoulder 263 will ride up the cam surface 266 until the shoulder 263 engages the shoulder 264.

The slide arm 260 is disposed in the path of movement of the ear 52 on the arm 47 so that whenever the arm 47 is rocked by operating the outside handle the slide arm 260 is likewise rocked. Whenever the slide arm 260 is rocked when in its upper position the portion 268 thereon will engage the shoulder 269 on the arm 250 and will rock arm 250 to release the catch. If, however, slide arm 260 is in its lower position, movement of the outside handle to move the arm 47 and the ear 52 will merely rock arm 260 about its pivot 267 with the portion 263 moving below the bevel 266 and without moving arm 250. Thus the position of the arm 260 determines whether or not operation of the outside push member will release the catch.

In order to move the slide arm 260 to unlocked position when the arm 250 is rocked an unlocking arm 275 (see Fig. 59) is pivoted to the support 171 by a pin 276 which passes through an aperture 276' in the arm and the apertures 214 and 215 previously mentioned. As shown, the unlocking arm consists of two layers 277 and 278 which may be suitably spot welded together. The layer portion 277 includes an elongated slot 279 which receives the pin 267 on the slide arm 260 (see Figs. 49–51). The portion 277 overlaps the slide arm while the portion 278 is mounted to move on the top front face of the lateral portion 251 of the release arm. The portion 251 of the release arm 249 is provided with a pin 280 and the construction is such that when the arm 249 is rocked about its pivot 267 the pin 280 will strike and rock the member 275 thus lifting the pin 267 and moving the slide arm 260 until the shoulder 263 contacts the shoulder 264 whereupon the latch is restored to unlocked condition.

When the slide arm 260 is in the unlocked or upper position, as shown in Fig. 49, movement of the release arm 249 will cause the pin 280 on the release arm to move downwardly but this will have no effect on the unlocking arm 275 since the pin will engage the arm only at the point of extreme downward movement of the free end of the unlocking arm.

From the foregoing description it will be apparent that movement of the inside door handle will cause the arm 249 to be rocked to release the catch 203 regardless of the position of the slide arm 260, and that movement of the outside release, when the slide arm 260 is in its upper position, will cause the member 260 to be rocked about the axis of the pin 267 and will carry the arm 249 with it thereby releasing the catch. If, however, the arm 260 is in lowered position and the outside door release is operated, only the arm 260 will be moved and thus actuation of the outside release member will not release the catch 203.

In order to prevent passengers from inadvertently locking themselves out of the vehicle it is desirable that means be provided whereby when the catch on a door is in locked position and the door is closed the action will result in the catch being unlocked. Further, it is desirable that means be provided whereby after the locking member is moved to locked position a manually operated member (which may be as described herein, the outside actuated latch release member) may be operated to a position whereupon the outside door being closed when its latch is in locked position will cause the latch to remain in locked position. Thus inadvertent locking of a door is prevented while deliberate locking of a door without the use of a key is provided for.

In order to accomplish this purpose the present disclosure includes a locking arm return member 290 (Figs. 60–65) which includes a body having side rails 291 and 292 with a slot 293 therebetween. The return member is pivoted on a pin 294 arranged on a stamping 295 which may be welded to the inside of the casing 168. The return member includes a forwardly and upwardly projecting tip 296, the upper end 297 of which is adapted to engage the lower end of the portion 262 of the slide arm 260 when the latter is in its lower position and raise the slide arm to its unlocked position.

In order to raise the member 290 it is engaged at 298 (Fig. 62) by the tongue 188 on the member 187 of the catch housing 170 previously described. As the catch housing swings about the axis of its pivot 205 the member 290 swings about the pin 294 and consequently as the catch housing swings upwardly the portion 188 moves outwardly along the engaged face 298 of the member 290 until the member 188 clears the tip 299 (Fig. 63) of the member 290 thus permitting the member 290 to drop to the position shown in Fig. 60.

The member 290 is normally urged forward by engagement of a spring 300 mounted on a pin 301 carried on a body 302 which is pivoted on a pin 303 on the stamping 295. Thus the member 290 is constantly urged forward so that the pin 294 engages the rear end of the slot 293. As the member 187 rises the spring 300 maintains this relation. When, however, the member 188 is moved downwardly (an action which occurs when the latch housing 170 is shifted downwardly to the position shown in Fig. 61), the member 290 is urged rearwardly thus compressing the spring 300. As soon as this position is passed and the tip 299 is cleared by the tongue 188 the spring 300 pushes the member 290 forwardly to the position of Fig. 62 so that the member 290 is ready to repeat its cycle of actuation.

Assuming that the slide arm 260 is in upper position (as shown in dotted lines in Fig. 60), movement of the catch housing 170 downwardly and then upwardly from the position shown in Fig. 60 will cause the member 290 to first move rearwardly and then upwardly as the catch housing moves upwardly, as previously described, without affecting the member 260 in any manner.

If, however, the member 260 is in locked position (as shown in full lines in Fig. 60) and the door is shut, the act of shutting the door will move the bolt 30 over the catch 203 as shown in Fig. 60 and will cause the arm 290 to retreat as the catch is being depressed until it assumes the position shown in Fig. 61 with the lower end of the slide arm 260 disposed just above the end 297 of the member 296. When the parts have just passed the position of Fig. 61 the face 298 will clear the tongue 188. The member 290 will then be advanced by the spring 300 to the position of Fig. 62. When the bolt clears the catch the catch housing will swing upwardly and the tongue 188 will move upwardly, raising member 290 so that the tip 296 will engage the portion 262 and will lift the arm 260 as shown in Fig. 63 until the arm 260 is returned to its unlocked position. Thus the act of closing the door after the latch on the door is in locked position will cause the latch to be unlocked.

If, when the arm 260 is in lowered position (Fig. 62), the outside latch release member is actuated, the portion 262 of the arm 260 will be moved to the dotted line position in Fig. 62 whereupon when the door is closed the bolt will first cause the latch housing to move down and will then release the latch housing, permitting it to move upwardly. The above described movement of the arm 290 will be repeated but in this operation the portion 262 of the arm 260 being in the dotted line position (Fig. 62) out of range of the tip 296 of the arm 290 will not be raised and therefore the latch remains locked.

When the member 290 has completed its motion and returns to the normal position the member 262 may be moved to unlocked position in the normal manner when this is desired. By means of the operation just described, that is by pressing an outside actuator while the door is being shut, the door, if the latch thereon is in locked position, will be caused to remain locked.

The member 290 is actuated by the catch housing 170 which latter returns to its normal position only after the bolt 30 is in full door closed position, in which latter position the ear 52 on the arm 47 is in position to move the slide arm 260 since it is within the area of this arm at the time the catch housing swings back to normal position.

If the portion 262 is made wider so that it will not clear the tip 296 even when in the dotted line position of Fig. 62, then the latch will always be unlocked by the movement of the housing 170. This provides an alternate construction.

In order to provide for synchronized locking the body pillars 15, which are shown as hollow, are provided with housings 310 and 311 (see Figs. 67 to 72). The housing 310 will be presumed to be on the curb side of the vehicle, while the housing 311 will be presumed to be on the driver's side of the vehicle, although the arrangement may be otherwise. The housing 310 includes side members 313 and 314 which are connected by transversely extending portions 315. The housing 310 is provided with aligned apertures 316 through which a pivot pin 317 extends. The pin 317 extends through aligned apertures 318 in a hollow locking lever 319.

The locking lever 319 is of general rectangular form in cross section and has spaced end portions 320 which receive a pin 321 which engages the working inner element 322 of a Bowden wire control the outer member 323 of which is removably held by a clip 324 secured to one of the members 315 as shown. Beyond the portion 320 the locking lever includes a reduced finger engaged operating tip 325 which extends through a slot 326 in a plate 327 shown as secured upon the inner face of the adjacent pillar.

One side of the locking lever 319 includes a downwardly extending wing 328 which is spaced from the adjacent side member 313 sufficiently to receive a snap-over spring 329 which latter is mounted in such way as to either urge the lever 319 against the tongue 330 on the side 313 or to hold the lever 319 in the upper position so that it contacts the lower edge 331 on the adjacent portion 315.

Remote from the operating tip 325, the lever 319 includes a pair of spaced lips 332 and 333, which are adapted to be moved from upper to lower position and vice versa by a camming member 334 on the shaft 335 of a lock member 336 which is removably held in a lock supporting housing 337, as by a set screw 338. The housing 337 may be spot welded to the side members 313 and 314 as at 339. The shaft 335 is rotated by a key 340. Details of the lock form no part of the present invention.

The cam 334 has an engaging face which is radially disposed so that it will engage either the wing 332 or the wing 333 to rock the lever 319. The key 340 can be withdrawn only when the cam is in the neutral position. Thus whenever the cam is in its neutral position the lever 319 can be rocked from the position in which it is in (whether locked or unlocked) to a reverse position by moving the tip 325 or can be rocked by turning the key.

The sides 320 of the locking lever 319 are provided with aligned, elongated slots 341 which are also aligned with apertures 342 in the housing 310. The pins 261 on the slide arm 260 pass through the apertures 342 and enter the slots 341 to thus couple the slide arms to the locking lever. The construction is such that when the locking lever 319 is rocked upwardly or downwardly the pins 261 will also be moved upwardly or downwardly and will carry with them the slide arms 260 thus moving the slide arms to locked or unlocked position.

The key 340 is adapted to be inserted through a hole 343 in the adjacent portion of the pillar 15. Just within the pillar a pair of keyhole closing members 344 are provided and are pivoted on a pin 345. A spring 346 serves to pull the members 344 to closed position. When the key 340 is inserted it will force apart the members 344 thus allowing the key to enter the keyhole in the lock member 336 and thus allow the lock to be operated. A pin 346' is engaged by the members 344 and centers them when they are closed.

The housing 311 supports a shaft 347 on which a locking lever 348 is mounted to rock. The locking lever as shown in Figs. 67 and 69 includes sides 349 and 350 and a bottom 351. The side 349 projects as at 352 to form a finger engaging portion by means of which the lever may be rocked. A wing 355 on the side 349 is spaced from the housing 311 to receive a snap-over spring 356 by means of which the lever 348 will be urged upwardly against a tongue 357 or downwardly against a tongue 357'. The tongues are formed on the housing 311.

The lever 348 at the end remote from the tip 352 has a fastening member 355 which engages the working element 322 of the Bowden wire 323 previously mentioned. A clip 324' secured to the housing 311 serves to hold the housing 323 of the Bowden wire.

The sides 349 and 350 of the lever 348 are provided with elongated slots 358' which are aligned with apertures 358 in the sides of the housing 311. The pins 261 on the adjacent slide arm 260 pass through the slots 358 and thus couple the slide arms 260 to the lever 348.

From the foregoing description it will be apparent that when either of the finger tips 325 or 352 is rocked the other finger tip will be similarly rocked in the same direction by means of the Bowden wire previously described and this movement of the finger tip will also move the associated locking levers which will be held in the position to which they are moved by means of the snap-over springs 329 and 356. Also, it will be apparent that the same movement of the locking levers may be obtained by operation of the lock 336 by means of the key described.

The locking lever 348 is provided with a downwardly depending portion 359 which has a slot 359' therein. The slot receives a pin 360 on a sleeve 361 which slides on the shaft 362 of a lock 363. The sleeve is mounted so that it will not rotate and is reciprocated by a pin 364 on the shaft 362 which works in a slot 364' in the sleeve. The construction is such that when the shaft 362 is turned by the key the pin 360 will move back and forth thus rocking the lever 348. The slot 359' is wider than the diameter of the pin 360 to permit the lever 348 to be manually rocked to unlocked position after the pin 360 has moved it to locked position and also permitting the lever 348 to be manually rocked to locked position after the pin 360 has moved it to unlocked position.

It will be apparent that the locking levers 319 and 348 may be moved either from within the vehicle by finger tip controls 325 or 352 or may be moved from without the vehicle by means of key controlled locks and that when moved all the latches will be coincidentally moved from locked to unlocked position and vice versa.

As previously described, when the slide arms 260 are in lowered or locked position and the inside release member is operated to open any door the operation will cause the slide arm 260 on that door to be raised to unlocked position by means of the unlocking arm 275 and by means of the construction just described this operation will cause all of the locking levers 319 and 348 to be moved from locked to unlocked position. Thus the opening of any one door (when all of the latches are in locked position) by actuation of the inside door release member will coincidentally cause all of the slide arms to move to unlocked position.

In order to prevent accidental opening of the doors as by children or thoughtlessly by older persons, the disclosure provides means whereby when the vehicle is running the latches may be released only when heavy pressure is applied to the latch release members.

From the preceding disclosure it will be apparent that whenever any latch is released by movement of either the inside release member or the outside release member the associated release arm 249 is rocked about its pivot. The arms 249 are provided on the lateral portions 251 with upwardly extending pins 365. These pins project through the notched or cut-away portions 227, previously mentioned and are adapted to pass through aligned holes 366 in housing 310 and 311 and in the pillars. The holes 366 are of sufficient size to allow the pin 365 to move back and forth.

Each pin 365 projects into the associated casing 310 or 311 and in the casing 310 the pin enters a slot 367 in a speed controlled lever 368 and normally engages the lower wall 369 of the slot. The speed controlled lever 369 is pivoted on the pin 317 previously mentioned, and is arranged astride the locking lever 318 previously mentioned. The construction is such that whenever the arm 249 is rocked the pin 365 which engages the wall 369 of the slot 367 will move the arm 368 downwardly in Fig. 67. The slot 367 is of sufficient height so that when one of the pins 365 is moved to rock the associated lever the opposed pin will not be rocked but will remain stationary. This will prevent the act of releasing the latch on one door from causing the other door latches to be released.

The arm 369 is connected at 369' to an operating wire 370 of a Bowden wire which has an outside casing 371. This casing 371 has a bracket 372 which is held on the housing 310 by a screw 373. The Bowden wire extends to a speed controlled member 374 to be later described.

The housing 311 is provided with a speed controlled arm 375 which is mounted on the pin 347 and is arranged between sides of the locking lever 348. The lever 375 has upper wings 376 upon which the pins 365 of the associated latches normally rest. When either pin is moved downwardly it will rock the arm 375 downwardly about the pivot 347.

The free end of the arm 375 is connected by fastening means 377 with the Bowden wire 378, the casing 379 of which is secured by bracket 380 to the housing 311.

In the disclosure the two Bowden wires extend to the speed controlled member 374 which includes a housing 381 which is preferably arranged adjacent to the speedometer cable take-off of the engine which is driving the vehicle. The housing 381 is provided with a portion 382 on which the Bowden housing 371 and 379 are connected by clips 383. The wires 370 and 378 are connected by securing means 384 to a speed controlled arm 385 which is pivoted at 386 to the casing 381.

The speed controlled arm 385 is normally urged against a stop 386 by a spring 387. The stop 386 is positioned so that it is engaged by the arm 385 when the arms 368 and 375 are in their upper position in Fig. 67. If the arm 368 or the arm 375 is rocked it will cause the arm 385 to be raised against the tension of the spring 387.

The arm 385 includes a portion 388 which has a shoulder 389 thereon, engaged by a spring 390. The spring 390 is mounted on a rod 391 carried on an arm 392 pivoted on the pin 386. A stop 393 limits the movement of the arm 392 in one direction. From the construction it will be apparent that whenever the arm 374 is rocked it will tend to rock the arm 392, the latter being urged by the spring 391.

The arm 392 includes a lower portion 394 which is in the path of an arm 395 which is pivoted at 396 on the housing 381. The arm 395 has slots 397 therein which receive pins 398 mounted on a sleeve 399 in which a shaft 400 rotates. The shaft 400 includes a gear 401 driven by a gear 402 on a shaft 403 which may be the speedometer cable take-off shaft and which is subject to the speed of the vehicle. When the shaft 403 is rotated the shaft 400 will be rotated and will cause ball governor arms 404, mounted on a support 405 secured to the shaft 400, to rotate and to fly outwardly, thus moving a sleeve 409 axially along the shaft 400 and through the interposed ball race 410, moving the sleeve 399 axially against the tension of a spring 411 which engages a washer 412, the latter being engaged by a ball race 413.

Thus it will be apparent that whenever the shaft 402 rotates the ball members 404 will move the sleeve 399 thus rocking the lever 395 and moving it to the broken line position in Fig. 67, beneath the end 394 of the arm 392. When the arm 395 is in the broken line position in Fig. 67 and the arm 385 is rocked in the operation of opening any door the arm 385 can move only by compressing the spring 390 as well as the spring 387 and thus when the vehicle is running an added force is required to operate the latch members to door releasing position. As soon as the vehicle stops or its speed is reduced enough to allow the spring 411 to overcome the effect of the ball members 404 the arm 395 will be moved to the full line position shown in Fig. 67, permitting the arm 392 to move downwardly so that the spring 390 will then not oppose the release of the latch.

The arm 368 has a portion 415 thereon which engages the locking lever 319 in such manner that whenever an associated pin 365 is moved in the act of releasing a latch the portion 415 will, when the arm 319 is in locked position, rock the latter arm to unlocked position.

Likewise when the arm 375 is rocked in the act of releasing a latch the portion 416 of this arm will engage the end portion 417 of the locking lever 348 and when this lever 348 is in locked position will move it to unlocked position.

Thus it will be seen that the speed controlled members 368 and 375 when operated while the locking arms are in locked position will move the locking arms to unlocked position. This actuation by the speed controlled members has substantially the same effect as the act of the locking arms 275 and the operation of one supplements the operation of the other.

One end of a coiled spring 420 slidably arranged in a slot in the floor 253 slidably engages the rear of the slide arm 260 and the other end thereof engages the end 213 of the support 171 and urges the slide arm to the full line position of Fig. 62.

The catch housing 170 and the catch support 171 have aligned holes 421 and the pivot pin 205 is hollow as shown. Fastening members such as screws 422 pass through the holes 421 and the pin and threadedly engage the pillars 15 to hold the housing 170 in place.

In Fig. 74 the catch 203' is shown as provided with a notch 423, otherwise the construction is the same as that previously described. The notch 423 provides a shoulder 424 which will be engaged by the bolt 30 just before the bolt moves to fully latched position. Thus the notch 423 provides a safety feature which in some instances might be desirable. When the notch is provided the ears 52 and 55 should be long enough to release the catch when the bolt is engaged by the shoulder 424.

In Fig. 75 a modified control member is shown similar to that shown in Fig. 68 and similar parts are designated by similarly primed reference numerals. In the modification the coincidental locking feature is omitted and the lock 336' engages the wings 332' and 333' on a lever 319' which has a forward extending portion 320' and a fingertip portion 325'. The lever 319' includes a slot 341" which functions the same as the slot 341'. The modified control member includes a second lever 319" mounted on the shaft 317' and which has a forwardly extending portion 325" aligned with and closely adjacent to the portion 325'. The lever 319" includes a depending portion 328" which receives a snap over spring, not shown, similar to the spring 329'. The portion 415 on the lever 319 is omitted so that the levers 319' and 319" move independently. The slots 341' and 341" receive pins 267' on each associated slide arm 260 in the manner previously described. The lock 336' locks only the latch associated with the lever 319'.

Since the tips 325' and 325" are side-by-side and coaxial they have similar paths and are accessible for simultaneous movement by a single action of an operator to cause simultaneous action of both locking means to either locked or unlocked position although they may be independently operated if desired. Thus, the advantages of coincidental locking are provided with a very simple construction.

It will be understood that a modified control member such as shown in Fig. 75 may be used on each side of the door with the speed control feature previously described employed or omittted as desired and with each control member having a lock 336 or with one of the control members having the lock omitted.

In Fig. 77 an arrangement is shown which is of the semi-coincidental locking type and which employs a control member similar to the one shown in Fig. 75. In the construction of Fig. 77 the arm 319" on the control member 310' is connected by means of a pin (not shown) similar to the pin 321 to one end of a Bowden wire 322'. The other end of the wire 322' is connected to a control locking lever 348' similar to the lever 348 previously described and mounted on a pivot 347' on a central member 311' so that the locking lever 348' is movable with the locking lever 319". The locking lever 319' is not connected to the wire 322' and so moves independent of the locking lever 319". In this construction, however, the lock 363 is shown as omitted as well as the portion 359, previously described. The parts of the control member 311' which are similar to those of Fig. 69 are designated by similarly primed reference characters. In this construction the lock 336' is effective to lock and unlock only the lever 319' which may control the right hand front door as stated although the arrangement may be otherwise. Thus it will be apparent that a single sweep of the finger may move tips 325' and 325" simultaneously to lock or unlock all of the latches from within the vehicle or that the tip 325' may be operated from within the vehicle to unlock only one door and that this one door may be locked or unlocked from the outside by the lock 336' which does not in any way control lever 319" which latter, as shown, controls all of the other doors. In Fig. 77 the speed control device is shown as 374', similar to that previously described.

Having thus described my invention, I claim:

1. A coincidental vehicle door locking system including a plurality of doors, a securing means for holding each of the doors in closed position, coincidental locking means independent of vehicle speed and operable from a location remote from the doors for locking the securing means against opening from without, inside means permitting each door to be opened individually from within independently of the remote coincidental locking means, restoring means, effective when a door is opened from within, while the locking means is locked to restore the locking means for all the doors to unlocked condition and vehicle speed controlled means for releasing the inside door opening means.

2. A coincidental vehicle door locking system including a plurality of doors, securing means for holding each of the doors in closed position, coincidental locking means independent of vehicle speed and operable from a location remote from the doors for locking the securing means against opening from without, inside means permitting each door to be opened individually from within independently of said remote coincidental locking means, means effective when the door is closed while the locking means is locked to restore the locking means for all the doors to unlocked condition and vehicle speed controlled means for releasing the inside door opening means.

3. A coincidental vehicle door locking system including a plurality of doors, a latch for each of the doors, coincidental locking means for locking the latches against operation, means operable when the locking means is locked and a door is closed to restore the locking means to unlocked condition and manually operated means operable previous to the actual closing movement of a door to render the restoring means ineffective to restore the locking means to unlocked condition.

4. A coincidental door locking system including a body having a plurality of doors hung thereon, a bolt on each door, a catch member for each bolt, the catch members being mounted on the body, coincidental locking means operable to place all catch members in locked condition and restoring means actuated by the catch members and operable upon movement of a catch member while the locking means is in locked condition to unlock the locking means, and means to render the restoring means ineffective when the doors are locked and a catch member is moved to unlock the locking means.

5. Latch means for a plurality of vehicle doors comprising releasable catch means on the vehicle body engaging securing means on the vehicle doors and adapted when the doors are closed to hold them closed, release means for said catch means operable from the outside or from the inside of the vehicle, locking means on the body controllable from the outside of the vehicle or from the inside of the vehicle for rendering said outside release means ineffective to release said catch means, a restoring element on the body for said locking means and a shiftable element on the vehicle body coacting with the restoring element to reset all of said locking means to unlock said release means upon closing any door after said locking means has been set to lock said release means, and means to render said restoring element ineffective to shift said locking means to unlocking position when any door is closed while the outside release means for that door is in latch releasing position.

6. A latch construction for holding a door member against a pillar member, including releasable latch members on the door and pillar coacting when the door is closed to hold the door closed, means on the pillar and effective when the door is closed for locking the latch members, said locking means being movable to locked position when the door is open or is closed, and selective means operable when the door is closed when the latch members are locked for unlocking the latch members or for leaving the latch members locked.

7. Securing means for a vehicle door comprising latch means adapted when the door is closed to hold it closed, release means for said latching means, locking means for rendering said release means ineffective to release said latch means and a restoring element for said locking means to reset said locking means to unlock said release means upon closing the door after said locking means has been set to lock said release means, means to actuate the restoring element, the actuating means including an energy storing element loaded by the act of closing the door, and means to render said restoring element ineffective to shift said locking means to unlocking position when the door is closed while said release means for the door is in latch releasing position.

8. In a vehicle body having a pair of hinged doors on one side and a pillar between the pair of doors, a housing on the pillar adjacent to each door, each housing having a tapering bolt receiving recess therein, a bolt movable on each door and having a portion passing through the peripheral edge of the associated door and engaging in the adjacent tapering recess, a catch on each housing movable into and out of the path of the bolt in the recess, means to normally hold each catch in the path of the bolt in the recess, a movable release arm for each holding means, lock operated means for rendering the release arms inoperative to release the holding means, an actuating member movable with each bolt and positioned to engage the associated release arm when the bolt is in the recess, and means on each door for operating each actuating member.

9. In a latch construction for holding a vehicle door member against a pillar member, a bolt adapted to be mounted on the door member, a support adapted to be mounted on the pillar member, a releasable catch movably mounted on the support for engaging the bolt on the door member, means normally preventing movement of the catch to bolt releasing position, and inside and outside means carried on the door and remote from the support for releasing the preventing means to permit the catch to move to free the bolt, and locking means on the pillar member operable to render the outside means ineffective to release the preventing means.

10. In a vehicle body having a hinged door and a pillar adjacent thereto, a support on the pillar adjacent to the door, the support having a bolt engaging portion, a bolt on the door and contacting the engaging portion, a catch adjacent to the engaging portion and movable into and out of the path of the bolt, means to normally hold the catch in the path of the bolt, a movable release member on the pillar operable to free the catch, lock operated means for rendering the release member ineffective to free the catch, an actuating member on the door and movable to engage the associated release member when the bolt contacts the engaging portion, and means on the door for operating the actuating member.

11. A door latch for a vehicle including a body having a door hung thereon, a bolt on the door, a releasable catch member for the bolt, the catch member being mounted on the body, locking means operable to place the catch member in locked condition and means actuated when the catch member moves while the locking means is in locked condition to unlock the locking means.

12. A coincidental door locking system for a vehicle which includes a body and a plurality of doors, a latch for each of the doors, each latch including a releasable catch member on the body and a coacting securing member on the door, coincidental locking means for the catch members, and means operable when the locking means is locked and a door is opened to restore the locking means to unlocked condition.

13. A coincidental door locking system for a vehicle which includes a body and a plurality of doors, a latch for each of the doors, each latch including a releasable catch member on the body, and a coacting securing member on the door, coincidental locking means for the catch members, means operable when the locking means is locked and a door is closed to restore the locking means to unlocked condition and manually operated means effective when the locking means is locked and a door is closed to render the restoring means ineffective to restore the locking means to unlocked condition.

14. A coincidental door locking system including a frame having a plurality of doors hung thereon, a bolt on each door, a catch member for each bolt, the catch members being mounted on the frame, coincidental locking means operable to place all catch members in locked condition and energy storing means loaded by the act of closing a door to actuate the restoring means and thereby unlock the locking means.

15. A coincidental vehicle door locking system including a plurality of doors, a latch for each of the doors, locking means for locking each of the latches against operation, means for coincidentally setting the locking means for each of the latches in locked position, restoring means operable when the coincidental means is in latch locking condition and any door is closed to cause the coincidental means to restore the locking means for each latch to unlocked condition, and manually operated means operable previous to the actual closing movement of a door to render the restoring means ineffective to restore the locking means to unlocked condition.

BURNIE J. CRAIG.

REFERENCES CITED

The following references are of record in the file of this patent:

UNITED STATES PATENTS

| Number | Name | Date |
|---|---|---|
| 1,233,295 | Appleby | July 17, 1917 |
| 1,383,088 | Earle | June 28, 1921 |
| 1,419,230 | Crompton et al. | June 13, 1922 |
| 1,479,744 | Salata | Jan. 1, 1924 |
| 1,888,184 | Shontz | Nov. 15, 1932 |
| 1,945,257 | Cook | Jan. 30, 1934 |
| 1,947,761 | Duquaine | Feb. 20, 1934 |
| 1,948,688 | Tarbox | Feb. 27, 1934 |
| 2,056,750 | Vincent | Oct. 6, 1936 |
| 2,099,456 | Sweet | Nov. 16, 1937 |
| 2,102,997 | Dall | Dec. 21, 1937 |
| 2,173,148 | Andersen | Sept. 19, 1939 |
| 2,187,530 | Butler | Jan. 16, 1940 |
| 2,187,531 | Butler | Jan. 16, 1940 |
| 2,187,933 | Craig | Jan. 23, 1940 |
| 2,187,936 | Craig | Jan. 23, 1940 |
| 2,211,928 | Haehnke | Aug. 20, 1940 |
| 2,218,685 | Ross | Oct. 22, 1940 |
| 2,233,078 | Hagstrom | Feb. 25, 1941 |
| 2,246,781 | Dall | June 24, 1941 |
| 2,260,326 | Marine | Oct. 28, 1941 |
| 2,304,145 | Borchers | Dec. 8, 1942 |
| 2,312,352 | Mickler | Mar. 2, 1943 |
| 2,314,815 | Brandt | Mar. 23, 1943 |
| 2,369,713 | Burgard | Feb. 20, 1945 |

FOREIGN PATENTS

| Number | Country | Date |
|---|---|---|
| 342,907 | Great Britain | Feb. 12, 1931 |